(12) United States Patent
Collins

(10) Patent No.: US 6,907,552 B2
(45) Date of Patent: Jun. 14, 2005

(54) RELATIVE DYNAMIC SKEW COMPENSATION OF PARALLEL DATA LINES

(75) Inventor: Hansel A. Collins, Mountain View, CA (US)

(73) Assignee: TriCN Inc., San Francisco, CA (US)

( * ) Notice: Subject to any disclaimer, the term of this patent is extended or adjusted under 35 U.S.C. 154(b) by 509 days.

(21) Appl. No.: 09/942,377

(22) Filed: Aug. 29, 2001

(65) Prior Publication Data

US 2003/0046618 A1 Mar. 6, 2003

(51) Int. Cl.[7] .......................... G11B 5/00; G11B 20/20; G06K 5/04; G06K 1/04; G06K 1/24
(52) U.S. Cl. ........................................ 714/700; 713/503
(58) Field of Search ........................... 714/700, 7, 814, 714/815; 713/503, 401, 400; 702/85, 89; 370/508, 517, 371

(56) References Cited

U.S. PATENT DOCUMENTS 5,513,377 A * 4/1996 Capowski et al. ............ 710/61
6,031,847 A * 2/2000 Collins et al. ............ 370/508
6,636,993 B1 * 10/2003 Koyanagi et al. ........... 714/700

* cited by examiner

Primary Examiner—Albert DeCady
Assistant Examiner—John J. Tabone, Jr.
(74) Attorney, Agent, or Firm—Russo & Hale LLP; William C. Milks, III

(57) ABSTRACT

A system performs a two-step skew compensation procedure by first correcting for any phase error alignment between a parallel link clock and data signal edges of each data channel, thereby allowing the received data bits to be correctly sampled. Then, a second step is performed to "word-align" the bits into the original format, which is accomplished with a Skew Synchronizing Marker (SSM) byte in a data FIFO of each data channel. The SSM byte is transmitted on each data channel and terminates the skew compensation procedure. When the SSM byte is detected by logic in the data FIFO of each data channel, the data FIFO employs the SSM byte to initialize the read and write pointers to properly align the output data.

10 Claims, 31 Drawing Sheets

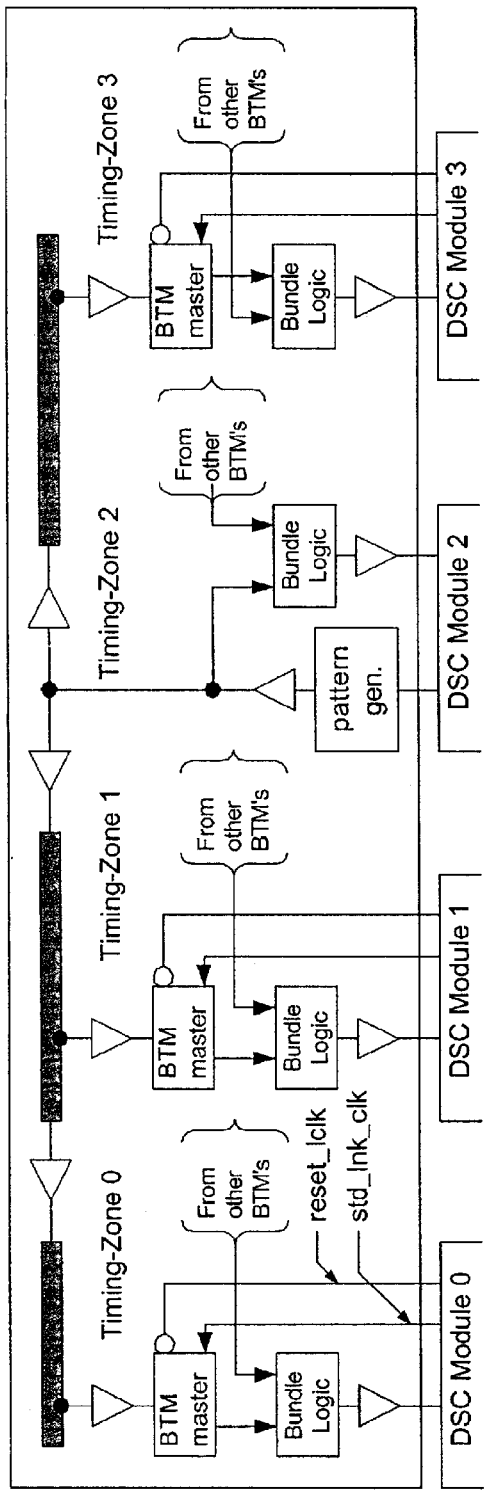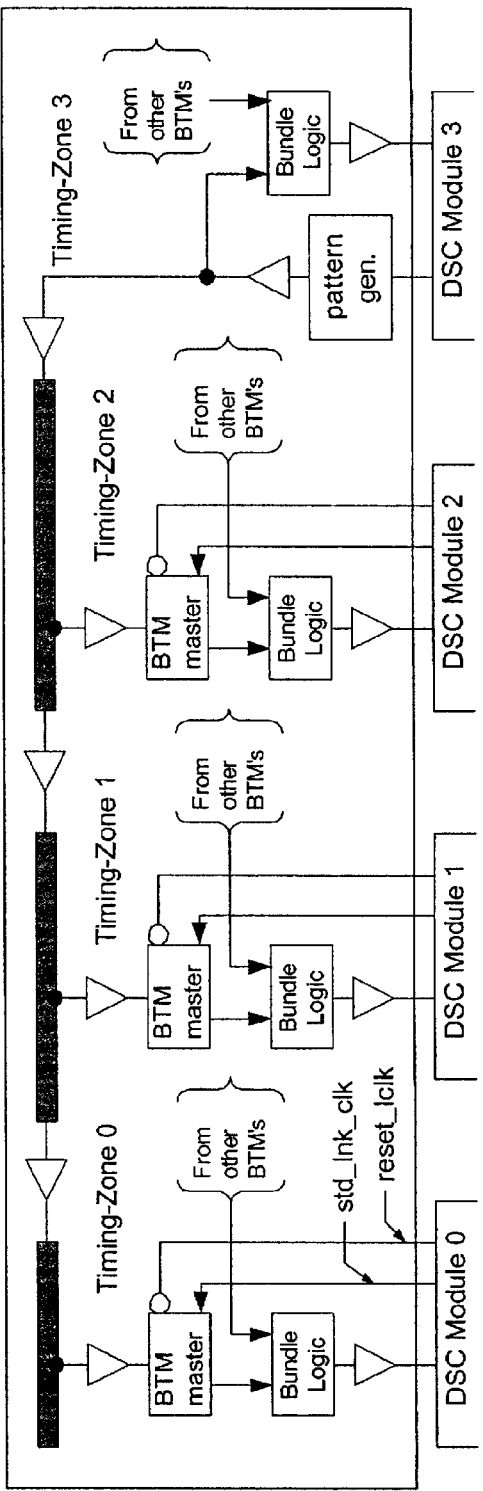
Figure 12A
Figure 12B

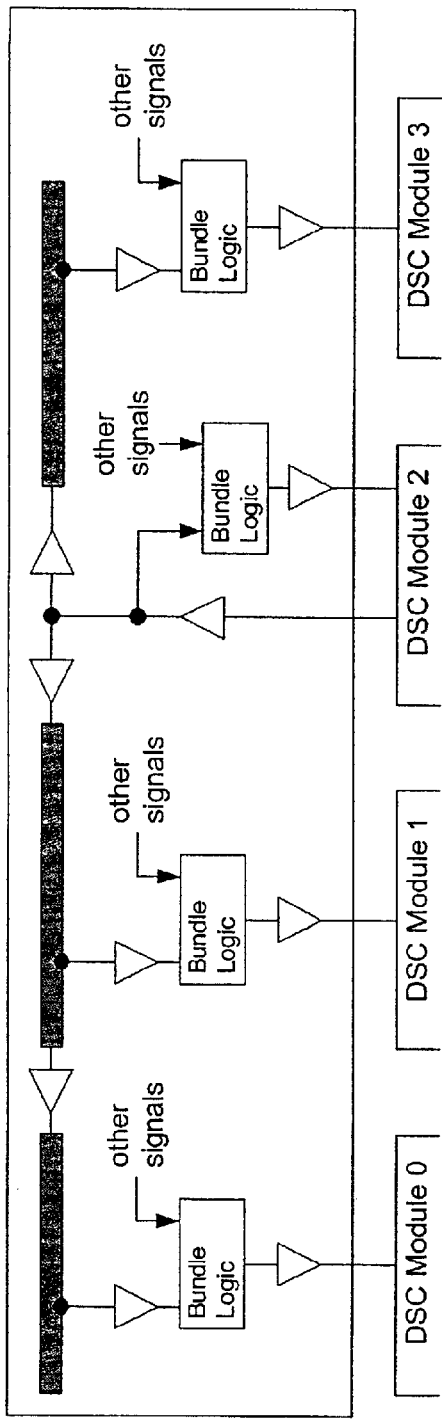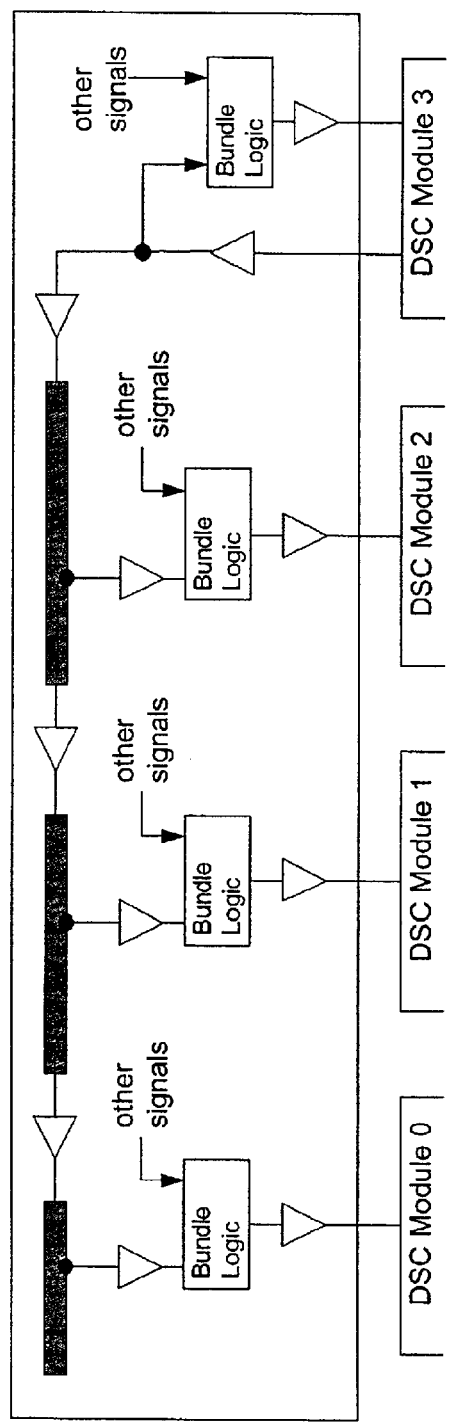
Figure 13A
Figure 13B

Data Channel DNA Process Flow

Clock Channel DNA Process Flow

RELATIVE DYNAMIC SKEW COMPENSATION OF PARALLEL DATA LINES

FIELD OF THE INVENTION

The present invention relates to high-speed data links and, more particularly, to high-speed parallel data links. Specifically, one embodiment of the present invention provides a system to deskew a high-speed parallel data link.

BACKGROUND OF THE INVENTION

As the speed and performance of digital systems increase, demands on interconnects that "link" these systems also increase. "Links" are communications paths between systems, sub-systems, and components enabling them to exchange data. Digital data can be transferred as pulses of electrical energy over electrically conductive material such as metal wires. An alternate technique for conveying digital data is by pulses of light over optic fiber.

Traditionally, serial line protocols employing encoded clock and data have been the protocols of choice for long-haul applications such as WAN (Wide Area Network), LAN (Local Area Network), SAN (Storage Area Network), as well as other proprietary links. This dominance includes both wire and fiber optic networks. A trend has also emerged at bandwidths of 2.5 Gb/s (current base line) and 10 Gb/s (projected to arrive within a few years) with companies that manufacture servers and routers as well as other high-speed digital systems vendors having begun to adopt serial line protocols as their high-speed backplane interconnect to implement their systems. This approach is being adopted for raising the overall throughput of digital systems.

The physical implementation of serial protocols of encoded clock and data is based on PLL (Phase Locked Loop) architectures to first recover the encoded clock and then employ the clock to sample received data. Critical design factors for a typical PLL are the LPF (Low Pass Filter) and VCO (Voltage Controlled Oscillator) that are area intensive for their implementation and guard-band or "keep-out" region.

The overall bandwidth of a serial link is determined by the characteristics of the interconnect medium and the PLL's ability to accurately recover the encoded clock. Hence, the bandwidth of a serial link cannot be increased easily from the original implementation, requiring a significant re-architecting and design effort.

Alternatively, parallel line protocols utilize like wires or optic fibers that simultaneously transfer a number of bits of digital data equal to the number of wires or optic fiber channels used, called "words." Ideally, all bits pertaining to a particular word arrive at the intended destination simultaneously and are sampled on the occurrence of the next available clock edge. In practice, however, this is typically not the case for high-speed parallel data links. That is, due to variations in the materials used to construct either wire or optic fiber links, as well as variations in fabrication process, the propagation delay or speed of the digital signals comprising the bits will vary slightly among wires or optic fibers. This results in differences in arrival times of the bits, referred to as "signal skew" or simply "skew." Wire skew and skew in optic fibers (skew contribution of wire or optic fiber) is proportional to the physical length of the path included in the parallel link. As the amount of skew between the lines of a parallel link increases, the skew further reduces the amount of bit "overlap" observed at the link's destination, thereby increasing the likelihood of a data sampling error. As a result, parallel links without a means of compensating for skew typically tolerate a total (both line and circuit) skew budget of less than 20% of the nominal bit time. This limits the operational distance and bandwidth of most parallel links to less than 10 meters in cable running at approximately 400 Mb/s and 0.15 meters at 1.0 Gb/s using the more common backplane fabrication materials.

Compensation techniques for skew in parallel links are known. One approach to compensate for skew was developed for the ANSI HIPPI-6400-PHY standard by Silicon Graphics, Inc. located in Mountain View, Calif. As disclosed in U.S. Pat. No. 6,031,847, a training sequence is used to measure the amount of skew between each of the parallel channels, that includes clock, data, frame, and control bits. The training sequence is comprised of four sub-sequences: 1) preamble, 2) flush sequence, 3) ping sequence, and 4) post-amble. Assuming that the leading edge of the ping sequence of all channels is aligned at the time of launch from the source, any difference in arrival times at the destination represents the amount of skew present among the channels. Based on measurements, additional delay is added to each channel to re-establish the alignment of the received bits. Once edge alignment has been re-established, the clock signal is further delayed to center its edges with respect to the center of the data bits to more accurately recover received data.

Considered in more detail, FIG. 1 shows a timing diagram of the training sequence developed for the HIPPI-6400 ANSI standard. Shown is the training sequence having four sub-sequences consisting of a preamble command, flush, ping, and post-amble. The training sequence is "balanced" with zero and one assertion times being equal. An important feature is that the length of the flush and ping sequences must match, and the length of each sequence must exceed the total skew for the link to be compensated.

Additionally, FIG. 2 shows a block diagram for a known data channel architecture having a conventional delay line, namely, a SuMAC data channel. The SuMAC DSCC's (Dynamic Skew Compensation Circuit) data channel consists of input measurement control circuitry and logic, an inverter chain, measurement latch, tap decode logic, and tap-select "OR" tree. The length of the inverter chain and all other associated structures must be equal to or larger than the skew to be compensated.

There are three key attributes of this architecture that must be considered when extending the "skew range." A first attribute to be considered is that the training sequence used in this scheme creates flush and ping sub-sequences during which the switching activity on the parallel link goes to zero for a period of time. This period of switching inactivity introduces a short-term drift in the DC balance of copper cable and ambient light level of fiber optic links. Short-term drift of both DC balance and ambient light produces a "start-up" uncertainty or "jitter" phenomenon when switching activity resumes on the link. The "start-up jitter" phenomenon occurs at the critical flush and ping sub-sequence boundary, thereby affecting the accuracy of the skew measurement. Hence, when the training sequence is modified to accommodate a greater skew range, the flush and ping sub-sequences must be increased, which creates a larger imbalance in the DC level of a copper cable link or ambient light level for a fiber optic link. Ultimately, this can reduce the maximum bandwidth obtainable due to measurement error caused by larger amounts of "start-up jitter" being introduced into the skew measurement.

A second attribute that must be considered is the number of channels that can be practically constructed. As shown in FIG. 2, an internal signal, "All_Present," generated by the logical "AND" of the individual ping signals received by all of the channels must be re-distributed to all of the channels of the parallel bus in order to capture the skew values. As the number of channels increases, the logical "AND" function must also increase, thereby requiring more time to complete this function. Hence, the overall size of all of the channels delays the arrival time of the "All_Present" signal, requiring the delay line to be lengthened and the overall size of the delay stack to be increased, resulting in higher power dissipation.

A third attribute concerns the overall length of the delay that governs the total amount skew that can be handled. Hence, to increase the skew range, the length of a delay line comprising the hardware and overall size of the delay stack must be increased proportionately. As a result, the delay line is more difficult to design, and the increased size also increases the power that is dissipated.

It would therefore be desirable to effectively correct for skew in a parallel link at higher bandwidths to assure that data is accurately sampled. It would also be desirable to enable skew to be corrected using hardware that does not require a long delay line or increase power consumption. Additionally, it would be desirable to provide a skew correction architecture that is scalable to avoid having to redesign the hardware from one application to another.

SUMMARY OF THE INVENTION

The present invention provides a method and apparatus for relative dynamic skew compensation of parallel data lines. One embodiment of the present invention provides a system that performs a two-step skew compensation procedure referred to as a training sequence by first correcting for any phase error alignment between the parallel link clock and data signal edges of each data channel, thereby allowing the received data bits to be correctly sampled. Then, a second step is performed to "word-align" the bits into the original format, which is accomplished with an SSM (Skew Synchronizing Marker) byte in a data FIFO of each data channel. The SSM byte is transmitted on each data channel and terminates the training sequence. When the SSM byte is detected by logic in the data FIFO of each data channel, the data FIFO employs the SSM byte to initialize the read and write pointers to properly align the output data.

In accordance with various embodiments of the present invention, a link is comprised of source and destination nodes with an interconnect medium constructed of copper cable or optic fiber, for example. At the link source node, an SSD (Source Synchronous Driver) formats "M" bits of input data received from the core logic and drives "M" data channels onto the physical link along with a link clock. The "M" data bits and link clock are received at the link destination node by a Dynamic Skew Compensation (DSC) architectural block that compensates for skew, re-centers the link clock edge relative to the bits of data, and outputs "M" bits of data.

A novel delay line architecture referred to as a "Multiple-Input-Single-Exit" delay line, or MISX-DL, provides a variable multi-tap delay line configuration in which the delayed signal is extracted from the last tap of the delay line and the input signal is introduced at 1-of-m "injection points" along its length. The desired delay is achieved by introducing the input signal at a selected injection point relative to the last tap of the delay line, thereby eliminating the need for a conventional tap-select multiplexer circuit. As a direct result of eliminating the multiplexer circuit, a reduction in the overall size, delay latency, and switching power is achieved. Additionally, with the incorporation of a signal phase splitter circuit, the delay line architecture can easily support tap resolutions based on an inverter delay with a modest increase in the number of transistors required, thereby effectively doubling the resolution.

Further, a novel data FIFO architecture is provided based on an "Ordered Population Count" sequence with Gray-code characteristics along with a mathematical procedure and logic implementation, that eliminates the need for conversion and significantly reduces comparison latencies. The architecture supports a latch-based implementation to accommodate high-speed applications.

Also, a gated clock provides a latch-based technique for controlling the starting and stopping of a high-speed clock signal while utilizing re-generative feedback to prevent clock glitch. A further extension provides a means of producing a divide-by-n clock signal that remains synchronous with a similarly generated reference base clock signal. The link width is comprised of one or more parallel data channels and link clock that together form a "bundle." At the link destination node, the receiving bundle consists of one or more DSC Modules having the same or mixed sizes and a Bundle Interface Module (BIM) for bundles containing two or more DSC Modules.

Each DSC Module preferably includes a single clock channel and one or more data channels. The clock channel receives the link clock signal, generates a data-recovery link clock, and distributes the data-recovery link clock along with the standard link clock signal to all data channels within the DSC Module. Each data channel of a DSC Module receives a link data signal, phase-corrects, and captures data using the data-recovery link clock signal. Recovered data is then word-aligned in the data FIFO for that data channel before being presented as output data to the core logic.

The clock channel of each DSC Module is preferably comprised of three sub-blocks, including a clock channel front end, BIST (Built-In Self-Test) block, and utility block. The clock channel front-end block generates the data-recovery link clock signal and distributes this signal to all data channels within the DSC Module. The BIST block provides a means for testing critical functionality of the entire DSC Module and reporting self-test status. The utility block provides logical functions to coordinate the interface between a cold training sequence, warm framing sequence, and DSC and core logic and the data FIFO read pointer control across the bundle.

Each data channel of a DSC Module is preferably comprised of three sub-blocks, including a data channel front end, data FIFO, and utility block. The data channel front-end block functions to phase-correct the data and clock signal edges during the phase correction sub-sequence of the cold or warm training sequences. Once phase correction has been completed, the data-recovery link clock signal from the clock channel is employed to sample the phase-corrected data. The data FIFO block receives positive and negative phase-aligned data from the data channel front end and stores this data in a FIFO framed on the prescribed byte boundaries. The data FIFO block is also used to detect commands to initiate a warm training sequence and the SSM byte used to initialize the write pointer frame counter and start the data FIFO read pointers in the bundle for both cold training sequence and warm training sequence operations. The utility block of the data channel performs two primary functions, namely, 1) data FIFO read pointer control and coordination and 2) diagnostic register control and interface.

The Bundle Interface Module (BIM) distributes, re-times, and logically combines broadcast signals between all DSC Modules in the bundle. The BIM also functions to combine broadcast module status signals from all DSC Modules within the bundle to interface to the core logic.

The cold training sequence (CTS) preferably consists of a clock channel CTS initiation sequence, delay trimming sequence, phase correction sequence, and a Skew Synchronizing Marker (SSM) byte transmitted on all data channels to perform an initial training sequence. The CTS protocol provides a method for forcing a DSC Module training sequence after a system power-up or reset or an unrecoverable link error.

An extended training sequence (ETS) consists of an ETS command sequence, delay-trimming sequence, phase correction sequence, and an SSM byte transmitted on all data channels to perform an initial training sequence. ETS commands are detected while preventing false training sequences due to single and multi-bit errors across all data channels of the parallel data link.

The warm training sequence (WTS) consists of a WTS command sequence, phase correction sequence, and an SSM byte transmitted on all data channels to perform a periodic training sequence. WTS commands are detected while preventing false training sequences due to single and multi-bit errors across all data channels of the parallel data link.

The system in accordance with the present invention effectively compensates for relative deskew on a parallel link. The hardware implementation of the deskewing circuit of the present invention includes a delay line having a reduced parts count and reduced power consumption, and the deskewing circuit is process independent and is scalable.

BRIEF DESCRIPTION OF THE DRAWINGS

FIG. 12A is a detailed block diagram of the Bundle Interface Module (BIM) shown in FIG. 5 for an exemplary four-module signal interconnect and logic circuit for signals operating at link speeds. As shown in FIG. 12A, the BIM has a pattern generator resident at DSC Module port 2 as the source and Bundle Timing Module (BTM) masters at the destination nodes of DSC Modules 0, 1, and 3 ports. The signal from the pattern generator is buffered and fed onto interconnecting metal wires to the other module ports, with distributed re-buffering circuits along the signal path length. The BTM drives the bundle logic for the DSC Module ports.

FIG. 12B is a detailed block diagram of an alternative embodiment of the Bundle Interface Module (BIM) similar to the embodiment shown in FIG. 12A but with the pattern generator resident at DSC Module port 3.

FIG. 13A is a detailed block diagram of the Bundle Interface Module (BIM) shown in FIG. 5 for the exemplary case of a four-module signal interconnect and logic circuit for signals operating at core speeds. As shown in FIG. 13A, the source resides at DSC Module port 2, and bundle logic resides at the destination nodes of DSC Modules 0, 1, and 3 ports. The signal from the source node is buffer-driven onto interconnecting metal wires to the other module ports, with distributed re-buffering circuits along the signal path length. At the destination nodes, the signal is received by the bundle logic for the DSC Module ports.

FIG. 13B is a detailed block diagram of an alternative embodiment of the Bundle Interface Module (BIM) similar to the embodiment shown in FIG. 13A but with the source resident at DSC Module port 3.

DETAILED DESCRIPTION OF THE PREFERRED EMBODIMENTS

Figure 1:
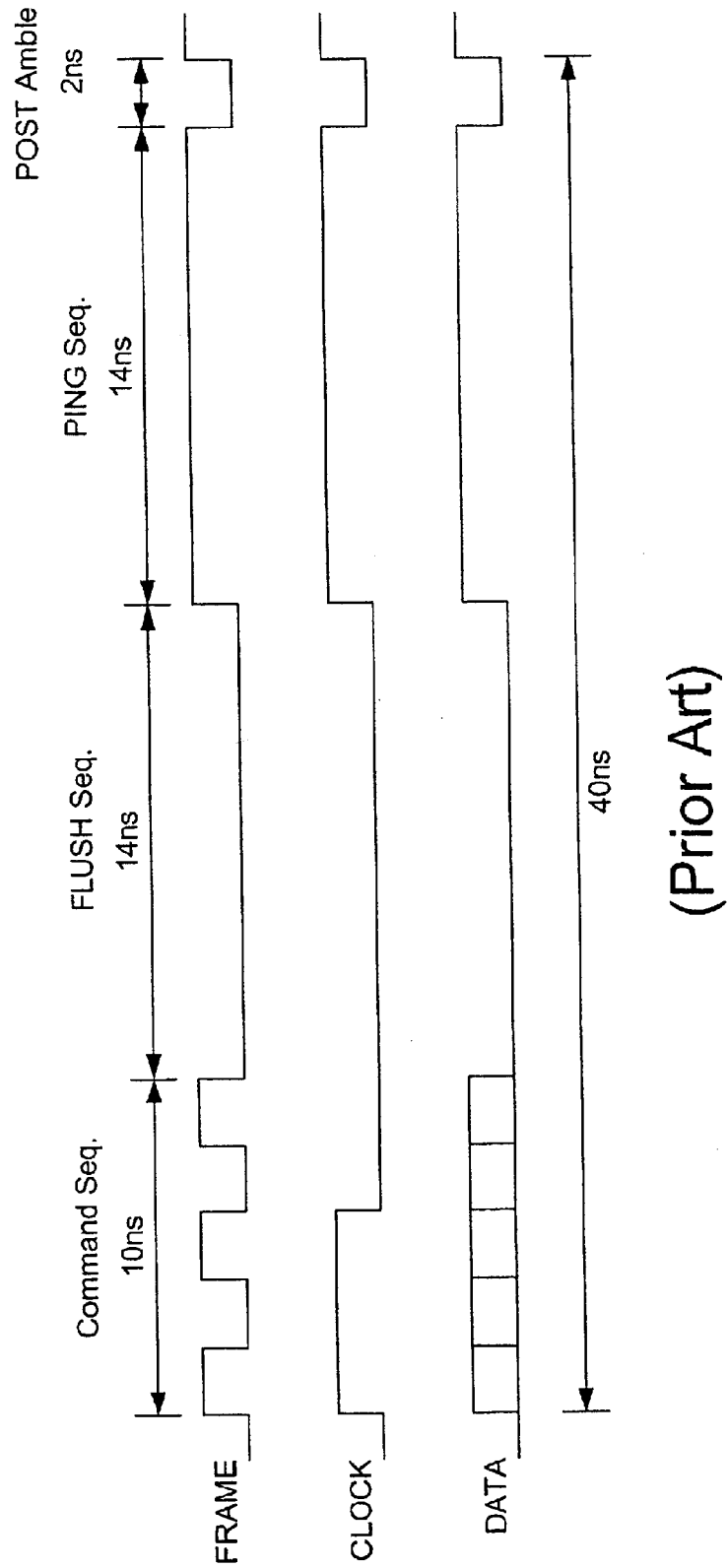
FIG. 1 is a timing diagram of a known training sequence in accordance with the HIPPI-6400 training protocol.
Figure 2:
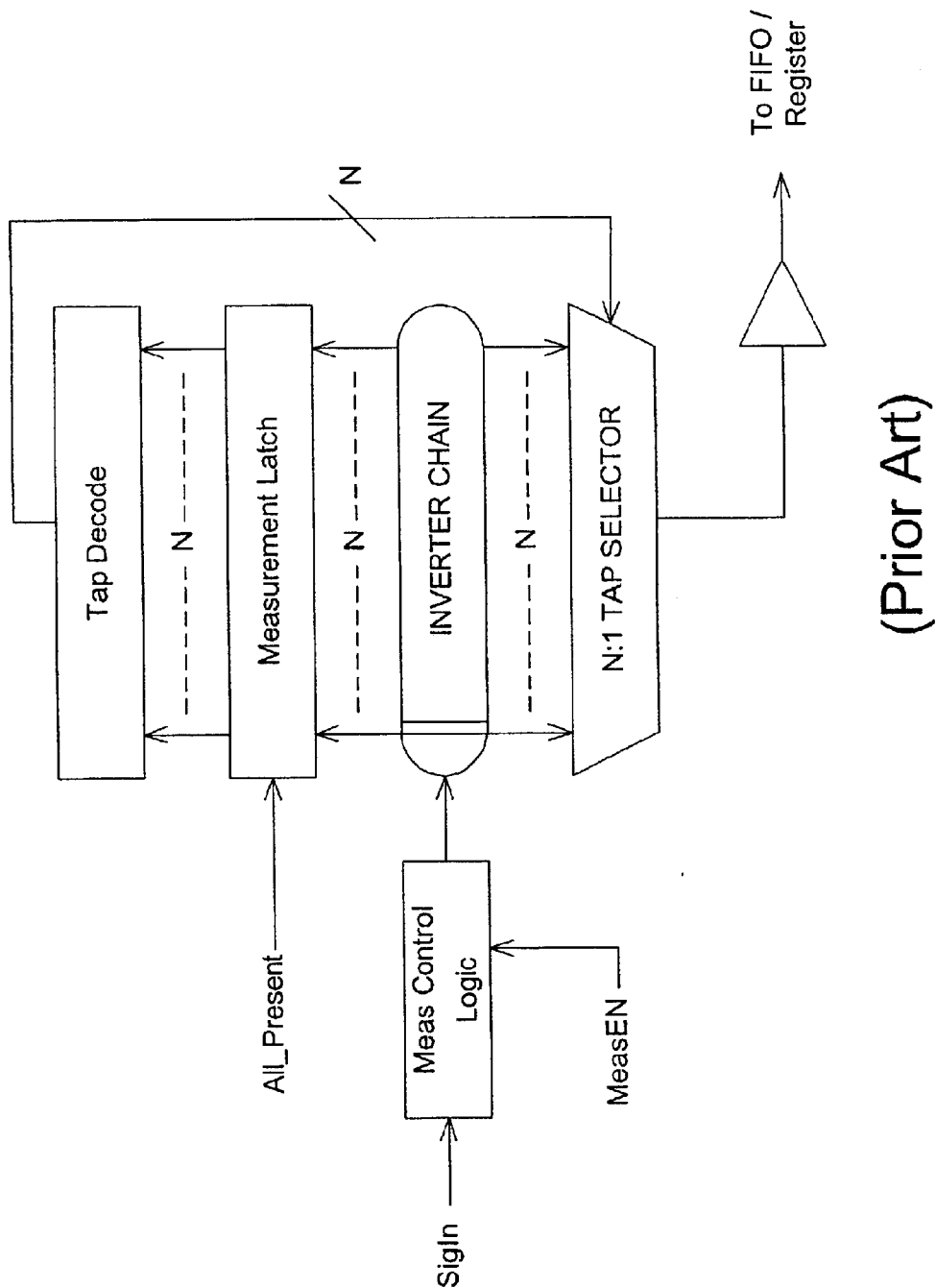
FIG. 2 is a block diagram for a known data channel architecture having a conventional delay line.

In accordance with the various embodiments of the present invention and referring now to the figures, wherein like reference numerals identify like elements of the various embodiments of the invention, one can effectively perform relative dynamic skew compensation of parallel data lines. Additionally, the hardware implementation of the deskewing circuit in accordance with the present invention includes a delay line having a reduced parts count and reduced power consumption, and the deskewing circuit is process independent and is scalable.

Figure 3:
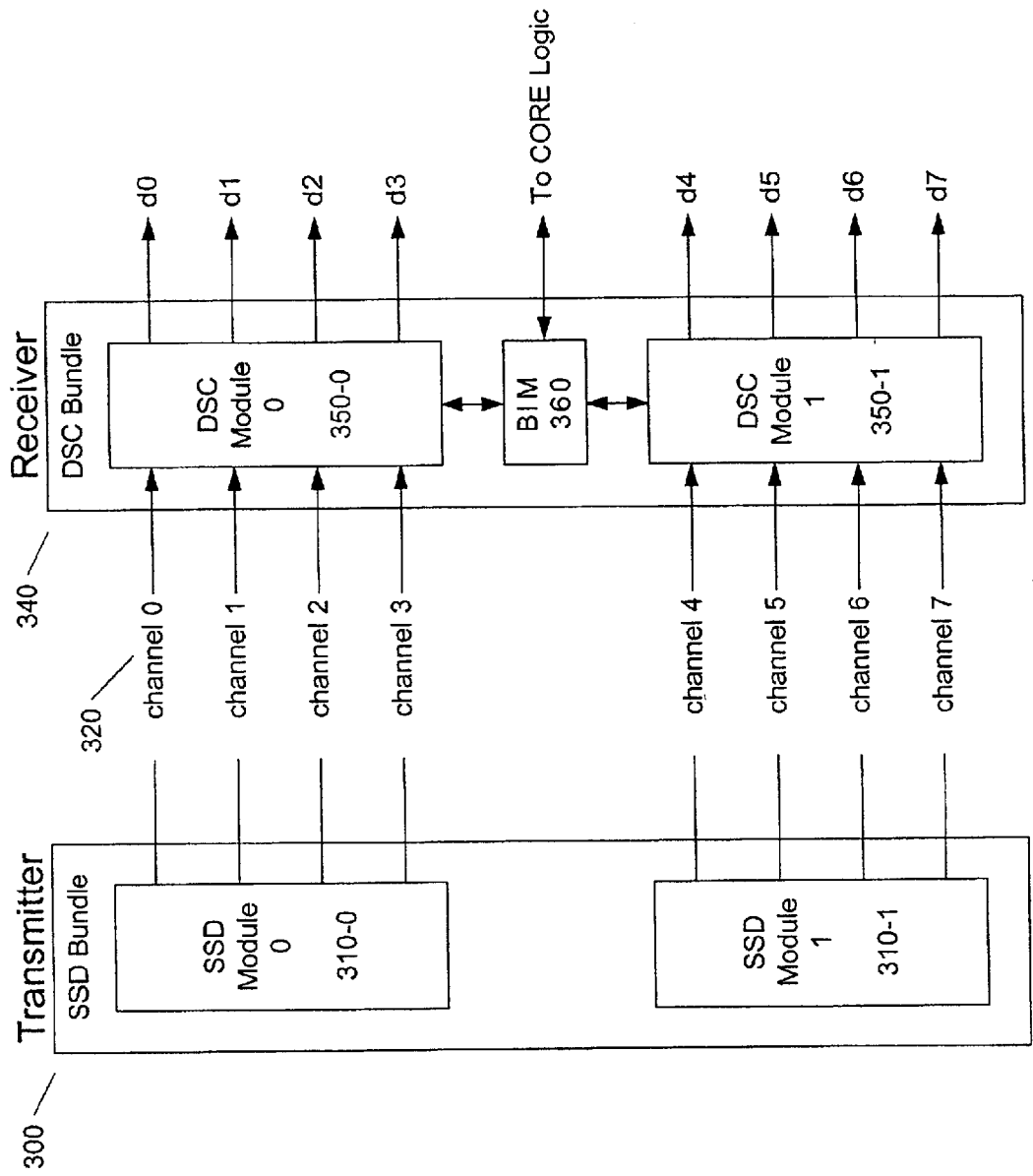
FIG. 3 is a high-level block diagram of a scalable architecture for a full parallel link in accordance with one embodiment of the present invention having a transmitter bundle node comprised of SSD modules, a physical interconnect of either optic fiber or wire, and receiver bundle node comprised of DSC Modules interconnected via a "Bundle Interface Module" or (BIM).
Figure 4:
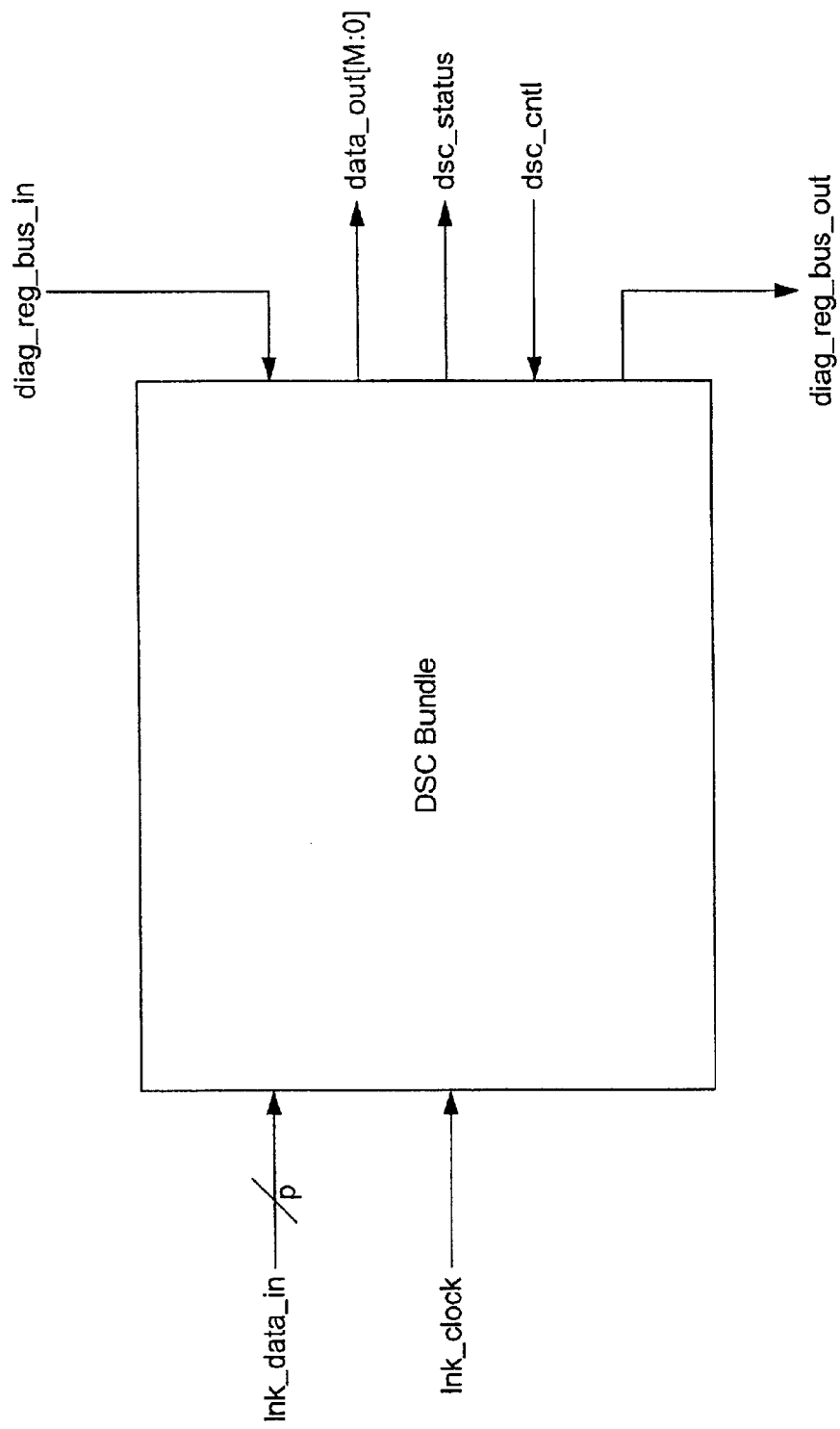
FIG. 4 is a high-level block diagram of a DSC bundle included in the architecture shown in FIG. 3 illustrating major signal ports.

A preferred embodiment of the deskewing system in accordance with the present invention is shown in FIG. 3. Generally, the link architecture and operation are as follows.

At a source node, a transmitter 300 comprised of one or more Source Synchronous Driver (SSD) Modules 310-0, 310-1, . . . 310-N drives data onto physical media, for example, optic fiber or copper ribbon cable, forming a parallel bus 320 consisting of a plurality of data channels 0, 1, . . . M with data edge-aligned to either the leading or trailing edge of a link clock. As clock and data signals propagate over the copper or optic fiber media, the signals on each channel experience propagation phenomena that are unique and uncorrelated to other signals on the parallel bus, resulting in different arrival times at a destination node where a receiver 340 resides. This difference in arrival times is referred to as "skew."

In order to successfully sample the received data, the skew between all data channels 0, 1, . . . M in the parallel bus 320 must be eliminated or significantly reduced and the link clock edge substantially centered within the data bit time period. Adjustments to compensate for channel-to-channel skew and centering of the link clock edge are performed by DSC Modules 350-0, 350-1, . . . 350-N during a cold training sequence (CTS), extended training sequence (ETS), or warm training sequence (WTS) operation, as will be described in more detail later. Both ETS and WTS operations assume that the link has been properly compensated and the link clock edge centered during an earlier CTS.

Figure 25:
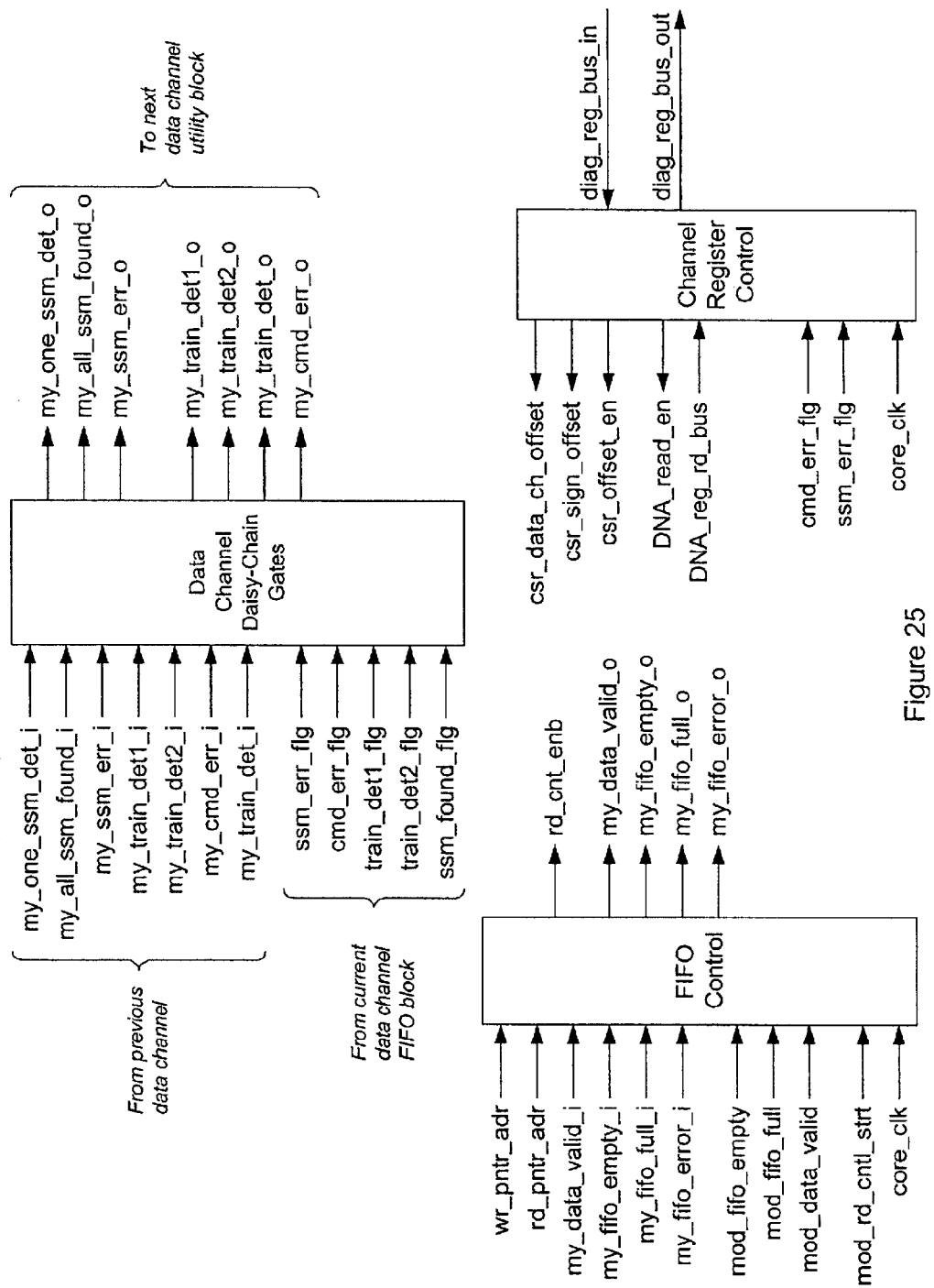
FIG. 25 is the top-level block diagram of the data channel utility block showing data channel daisy-chain gates, the FIFO control, and channel register control sub-blocks. The FIFO control generates FIFO status signals my_fifo_empty_o, my_fifo_full_o, my_data_valid_o, and my_fifo_error_o that are daisy-chained with status signals for other data channels within the DSC module. It also receives broadcast signals my_fifo_empty_i, bim_fifo_full_i, and bim_data_valid_i and generates a rd_cnt_enb signal that controls the read pointer of the data FIFO.

During normal operation, the primary functions of the DSC Modules 350-0, 350-1, . . . 350-N are the control of a data FIFO across a bundle and the detection of extended and warm training command sequences across the bundle. Data FIFO control, in particular, its read pointer across the bundle, is accomplished with a two-level distributed control scheme with a first level of daisy-chained signals within a DSC Module 350 and second-level broadcast status signals at the bundle level. This provides a means of scaling the coordination of the data FIFO across the bundle. Normal operation of the data FIFO is as follows. As shown in FIG. 1, a write-pointer-address vector wr_pntr_adr of the data FIFO block is sampled on each rising edge of the core clock and synchronized to the core clock domain by the FIFO-Status-Logic block, as shown in FIG. 25. The Read Pointer 110 address vector rd_pntr_adr is also sampled on each rising edge of the core clock and processed with the synchronized wr_pntr_adr. The read and write FIFO addresses are compared, and the FIFO status is determined, namely, state of data, FIFO full or empty state, and any error condition.

At each data channel the status of the associated data FIFO is processed with the status of the other data FIFO blocks to generate daisy-chained status signals: my_data_valid_o, my_fifo_full_o, my_fifo_empty_o, and my_fifo_error_o, as shown in FIG. 25. The status signals from the daisy-chained segments are combined at the utility block for a DSC Clock Channel 600 shown in FIG. 6 to create module bundle signals out, including bn/rx_data_valid, bn/rx_fifo_full, bn/rx_fifo_empty, and bn/rx_error shown in FIG. 15, that are broadcast to all DSC Modules in the bundle via the BIM 360 shown in FIG. 3. The distributed status signals are further processed at the exit port of the BIM 360 to each of the DSC Modules 350-0, 350-1, . . . 350-N and are passed to the DSC Modules as bim_data_valid, bim_fifo_full, bim_fifo_empty, and bim_fifo_error shown in FIG. 14.

Figure 6:
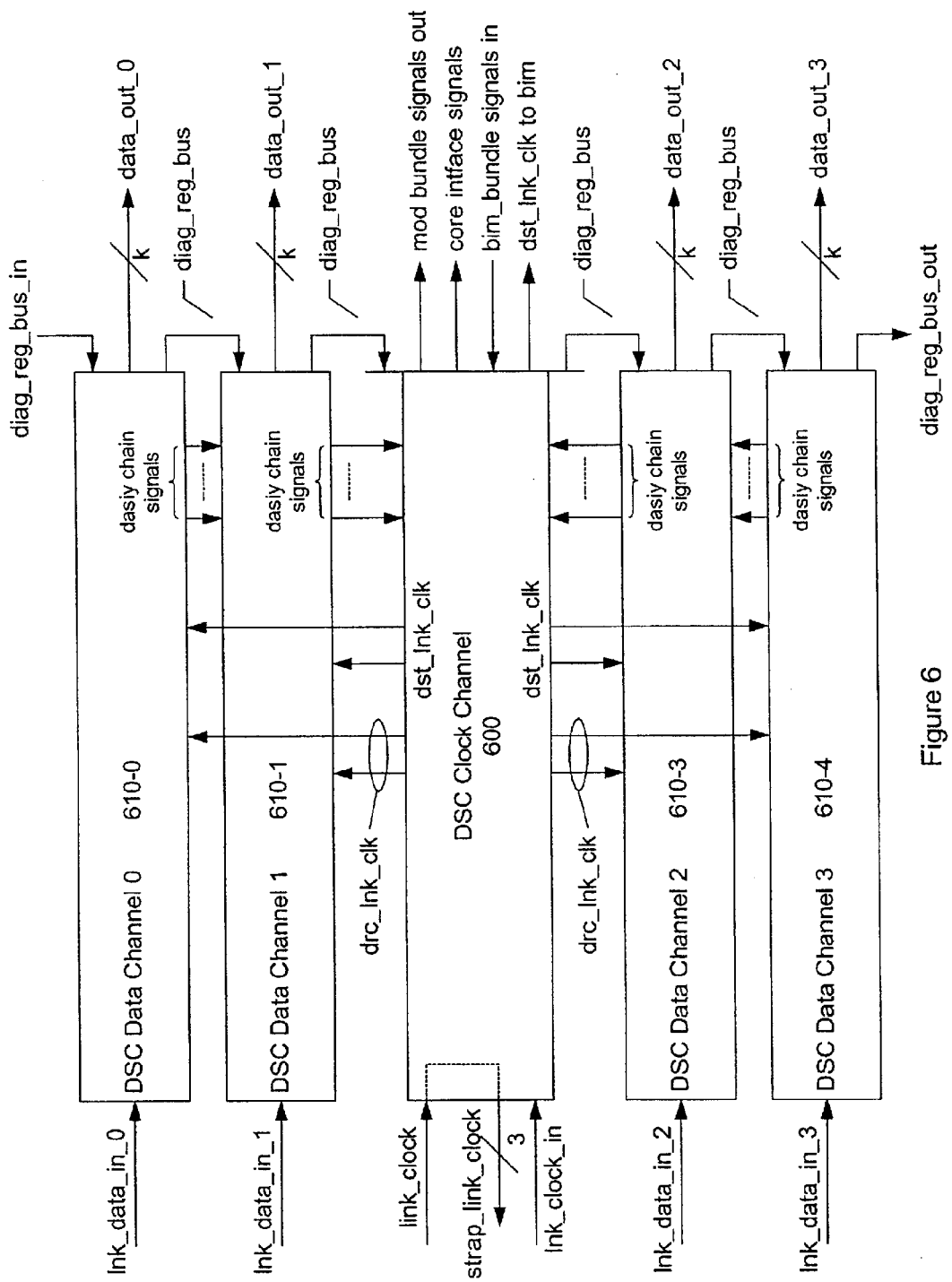
FIG. 6 is a block diagram of a four-channel DSC Module (DSC4) including four data channels, a clock channel, and hierarchical signals.

The distributed FIFO status signals bim_bundle signals in shown in FIG. 6 from the BIM 360 are received by the DSC Clock Channel 600 and distributed to each of the DSC Data Channels 610-0, 610-1, 610-2, 610-3, . . . . Depending on the DSC-to-core interface desired, control logic of the DSC Data Channels 610-0, 610-1, 610-2, 610-3, . . . receives part or all of the broadcast status signals and controls the rd_cnt_enb signal to the Read Pointer 1110 shown in FIG. 11 to advance or hold the Read-Pointer address.

ETS and WTS command searches are another primary function of the DSC Modules 350-0, 350-1, . . . 350-N. Detection of command sequences must ensure against "false" or "split" training scenarios in which a portion of the links in a bundle enters training while other links continue in normal operation.

Figure 11:
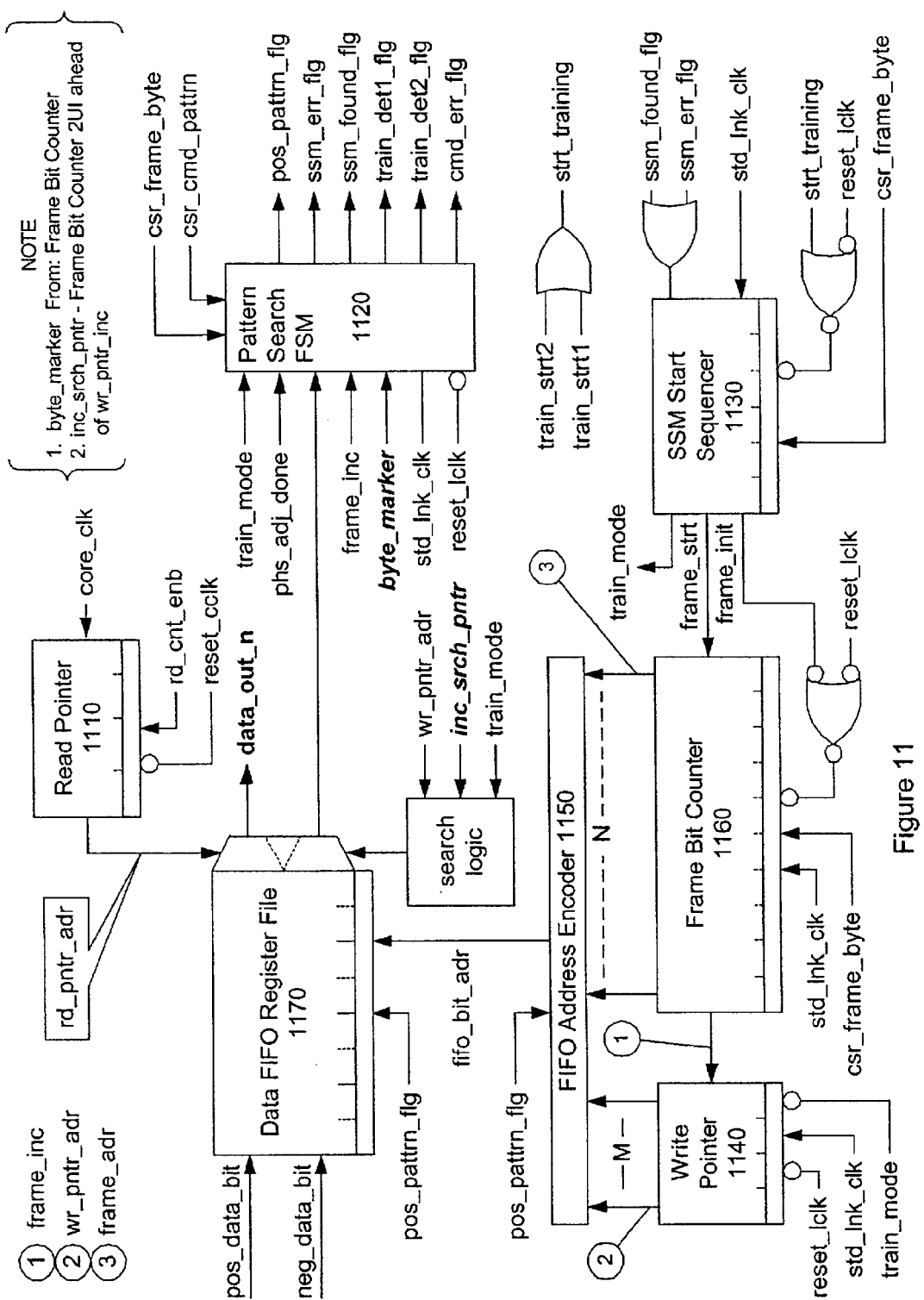
FIG. 11 is a detailed functional block diagram of the data FIFO block shown in FIG. 9 comprising a data FIFO register file, read pointer, pattern search sequencer, search logic, SSM start sequencer logic, frame bit counter, write pointer, and glue logic gates.

Considered in more detail, during normal operation the command detect is as follows. The transmitter 300 shown in FIG. 3 initiates an extended training sequence (ETS) or warm training sequence (WTS) with the transmission of respective ETS or WTS command byte sequences. As shown in FIG. 11, a Pattern Search FSM block 1120 performs both command sequence patterns and SSM-byte pattern searches during normal and training mode operations, respectively, on recovered data temporarily stored in the Data FIFO Register File 1170. With a signal train_mode in its non-asserted state, the Pattern Search FSM block 1120 searches for training command sequences. Signals frame_inc and byte_marker from a Frame Bit Counter 1160 are used by the Pattern Search FSM block 1120 to frame received command bytes. The Pattern Search FSM block 1120 asserts a signal train_det1_flg, train_det2_flg, or cmd_err_flg for a WTS command sequence, ETS command sequence, or for an error condition detected during the command sequences, respectively, and passed to the utility block. As shown in FIG. 25, signals train_det1_flg, train_det2_flg, or cmd_err_flg are each incorporated into incoming daisy-chained signals my_train_det1_i, my_train_det2_i, my_cmd_err_i, and my_train_det_i from the previous data channel before being passed as my_train_det1_o, my_train_det2_o, my_cmd_err_o, and my_train_det_o to the next data channel or terminating at the utility block of the clock channel. Signals my_train_det1_o and my_train_det2_o are the result of the daisy-AND function of my_train_det1_i, my_train_det2_i, train_det1_flg, and train_det2_flg. Signal my_cmd_err_i is the result of the daisy-OR function of my_cmd_err_i with cmd_err_flg, while my_train_det_o is the result of the daisy-OR function of signals my_train_det1_i, my_train_det2_i with my_train_det_i. Signal my_train_det_o is the daisy-OR function of my_train_det_i with the logic-OR of signals train_det1_flg with train_det2_flg of each data channel FIFO block. Signal my_train_det_o is used to inform the clock channel that at least one data channel within the DSC Module has detected a command sequence and initiated either an extended or warm training sequence. For the case of a command sequence error condition, the Pattern Search FSM block 1120 shown in FIG. 11 resumes the command sequence search.

Figure 7:
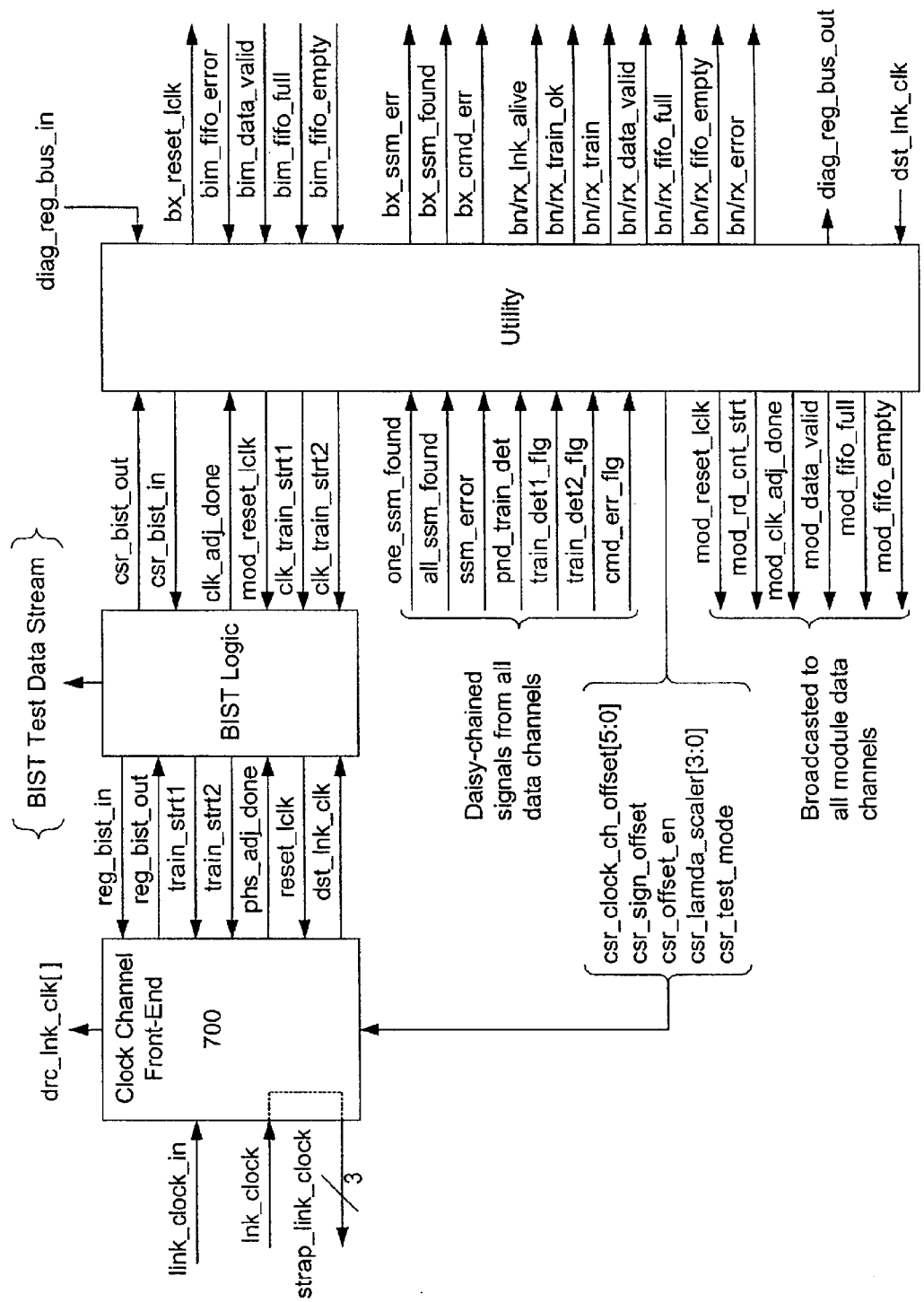
FIG. 7 is a detailed block diagram of the DSC clock channel shown in FIG. 6 having a clock channel front-end logic and circuitry block, Built-In Self-Test (BIST) block, and utility block to interface to the data channel(s) within the DSC Module and to either the BIM or host core logic.
Figure 28:
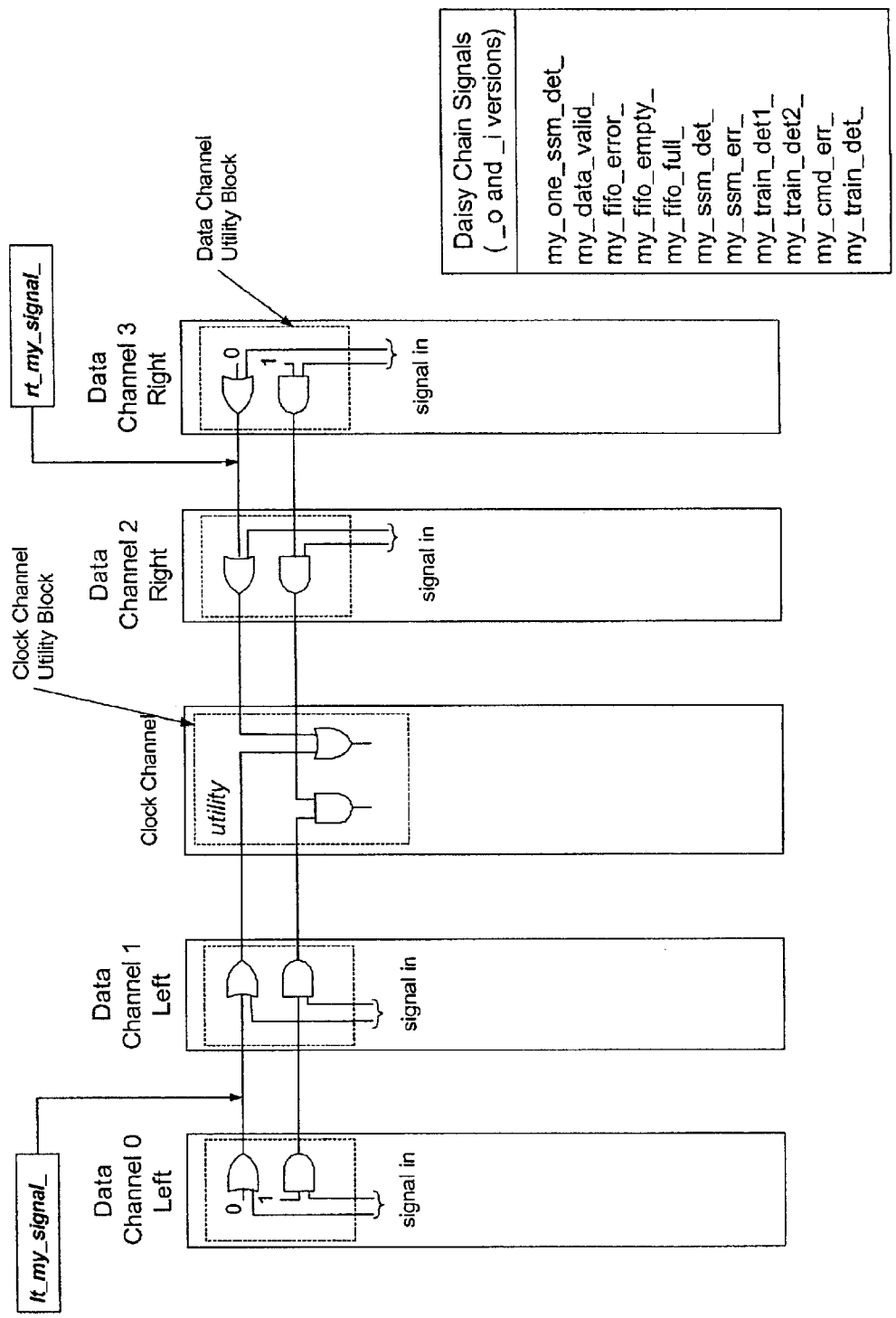
FIG. 28 is a top-level representation of the distributed daisy-AND and daisy-OR nets used to interconnect data channels of a DSC Module to the clock channel. A network is shown having both a left and right segment that terminate at the utility block of the clock channel. In the utility block of the clock channel, a logic gate of the same function combines the left and right segments of the daisy-AND or daisy-OR nets.

As shown in FIG. 28, left and right segments of signals my_train_det1_o, my_train_det2_o, my_cmd_err_o, and my_train_det_o terminate at the utility block of the Clock Channel 600 and are the products of the respective daisy-AND and daisy-OR functions of all the data channels of a DSC Module 350. Logic in the utility block operates on these signals received from the DSC Data Channels 610-0, 610-1, 610-2, 610-3, . . . and generates signals clk_train_strt (for example clk_train_strt1 and clk_train_strt2 shown in FIG. 26). Signal clk_train_strt1 or clk_train_strt2 is asserted if and only if my_train_det1_o or my_train_det2_o respectively is asserted and signals one_ssm_det_flg and my_cmd_err_o are not asserted (for example, clk_train_strt1 is asserted if and only if my_train_det1_o is asserted and my_cmd_err_o and one_ssm_det_o are not asserted). Signals clk_train_strt1 and clk_train_strt2 shown in FIG. 7 are used to initiate a warm training sequence (WTS) or extended training sequence (ETS) respectively in the clock channel only after all data channels in the DSC Module 350 have successfully detected and completed their training sequences.

In the case where an error has been detected in the command sequence, the Pattern Search FSM 1120 in the data channel FIFO block asserts the cmd_err_flg signal and re-initiates its search for a training command sequence. Assertion of the cmd_err_flg_signal in a data channel is logically-ORed with an incoming daisy-chained signal my_cmd_err_i producing signal my_cmd_err_o that is propagated to the next data channel eventually terminating at the utility block of the clock channel. The assertion of my_cmd_err_o prevents the assertion of either the clk_train_strt1 or clk_train_strt2 signal and the clock channel from executing a training sequence.

Figure 26:
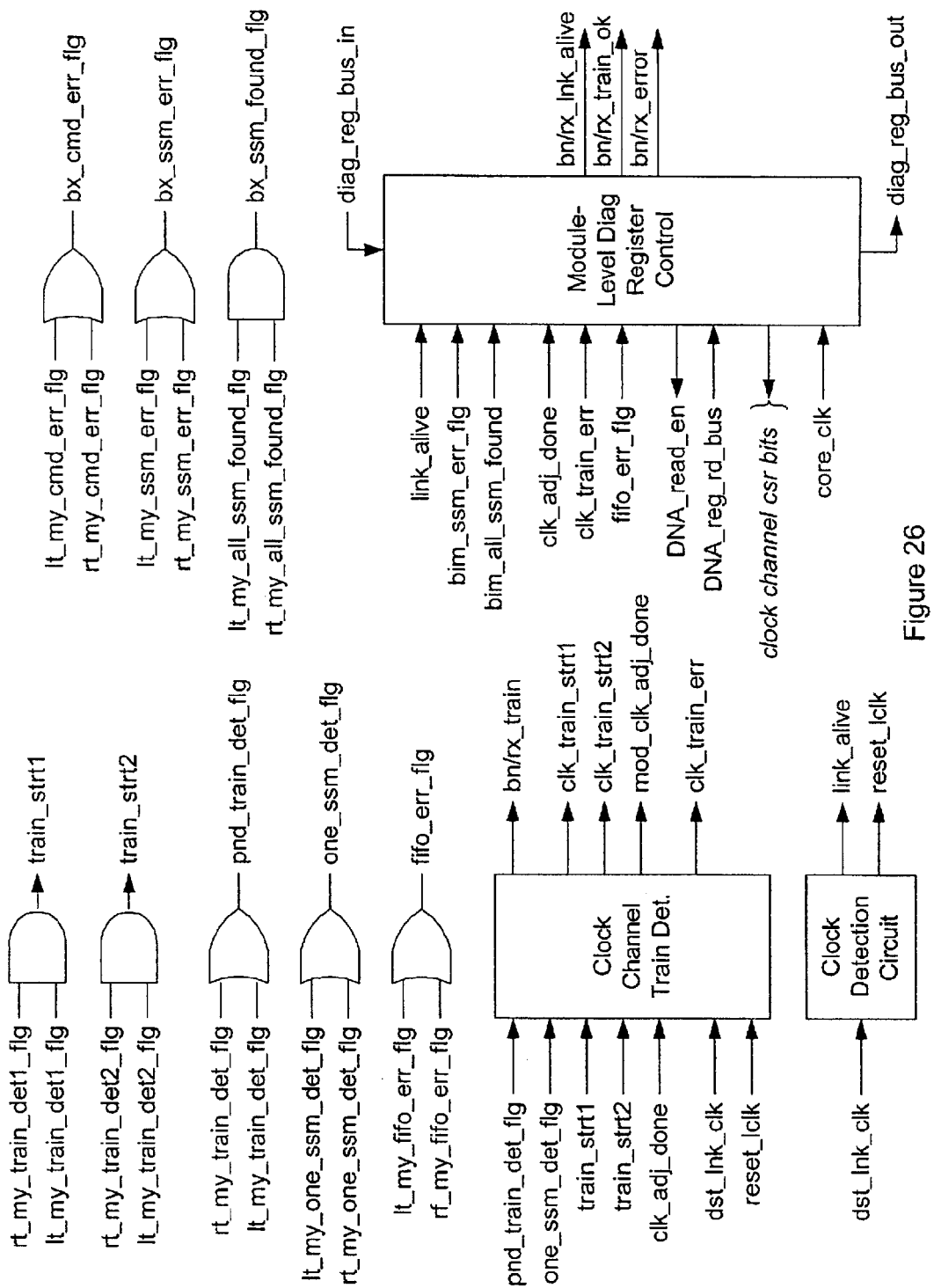
FIG. 26 is the top-level block diagram of the clock channel utility block with logic to implement the clock channel training detection, module-level FIFO control, module-level FIFO control logic blocks, and clock detection circuitry. Also shown are logic gates representing glue logic that generates intermediate signals used by the logic blocks.

In a second error condition excessive skew beyond specified limit is experienced by at least one data channel causing that data channel to enter its training sequence much later than other data channels in the bundle. The effect is that the clk_train_strt1 and clk_train_strt2 signals shown in FIG. 7 that start the clock channel training sequence are significantly delayed. If the one_ssm_det_flg signal shown in FIG. 26 is asserted prior to the assertion of the clk_train_strt signals, the clock channel aborts its training sequence.

The assertion of the ssm_found_flg signal by the Patter Search FSM 1120 of the data channel FIFO block is incorporated in the daisy-AND tree of signals my_all_ssm_found (for example, my_all_ssm_found_i and my_all_ssm_found_o shown in FIG. 25) and the daisy-OR tree of signals my_one_ssm_det (for example, my_one_ssm_det_i with my_one_ssm_det_o shown in FIG. 25) with all of these signals terminating at the utility block of the clock channel. The clock channel train detect logic asserts signals clk_train_strt1 shown in FIG. 7 if and only if one_ssm_det_flg (shown in FIG. 26) and cmd_err_flg (shown in FIG. 25) signals are not asserted.

A general description of the warm training sequence (WTS) will now be provided. A warm training sequence is both a sub-operation of the more comprehensive cold training sequence (CTS) and extended training sequence (ETS) operations, and can be an independent operation, as well. The purpose of WTS operation is to adjust for environmental conditions and the effects of those conditions on the operation of the entire link. The frequency of WTS or ETS must be sufficient to compensate for environmentally induced skew effects. This frequency of training is highly dependent on the environment and the application. Of the three training types, WTS is the most common and requires the least amount of time to adjust for any shift in the skew profiles.

WTS operations are initiated at the source node with the SSD Modules 310-0, 310-1, . . . 310-N transmitting a WTS command on all link data channels 320. The WTS command has a minimum number of consecutive command bytes (typically four bytes), that has a unique pattern not found in the normal data stream. In accordance with one modification of the present invention, alternative methods include adding additional channels to identify a training sequence, or a "byte count" may also be used to initiate a WTS command. An "error-free" minimal length or byte count for the WTS command is required to assure that random bit errors cannot initiate a false or spontaneous training sequence.

A description of the clock channel operation during a warm training sequence will now be described with reference to FIGS. 7 and 8. During a warm training sequence, the front end of the DSC Clock Channel 600 determines the clock offset value required for a data-recovery link clock, drc_lnk_clk, to center its edges within the data bit. Measuring the period of the link clock signal and dividing this value by a factor of four produces a preferred offset value of one-quarter lambda. During this period, a phs_adj_done signal is deactivated for a period of time after the assertion of a signal train_strt1 while the drc_lnk_clk assumes the newly acquired offset value.

Figure 29B:
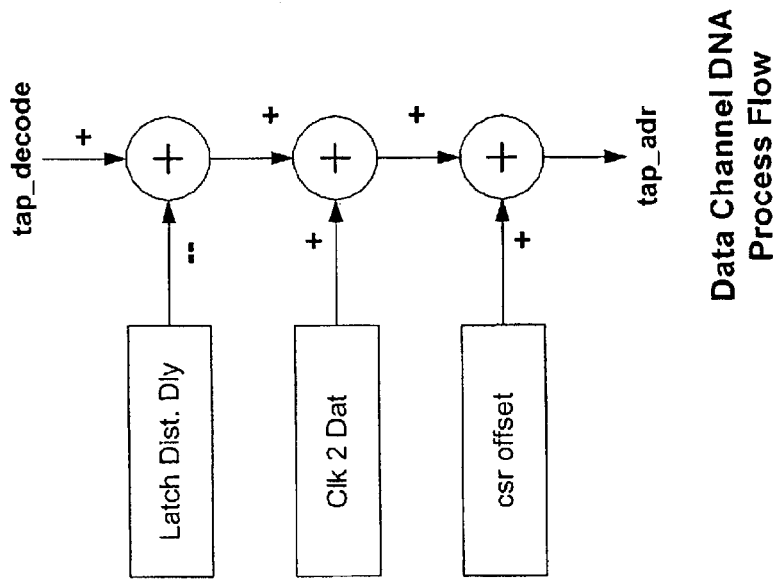
FIG. 29 is a flow chart of the modified binary search algorithm implemented to determine the sub-tap delay used during the delay trimming process.
Figure 29A:
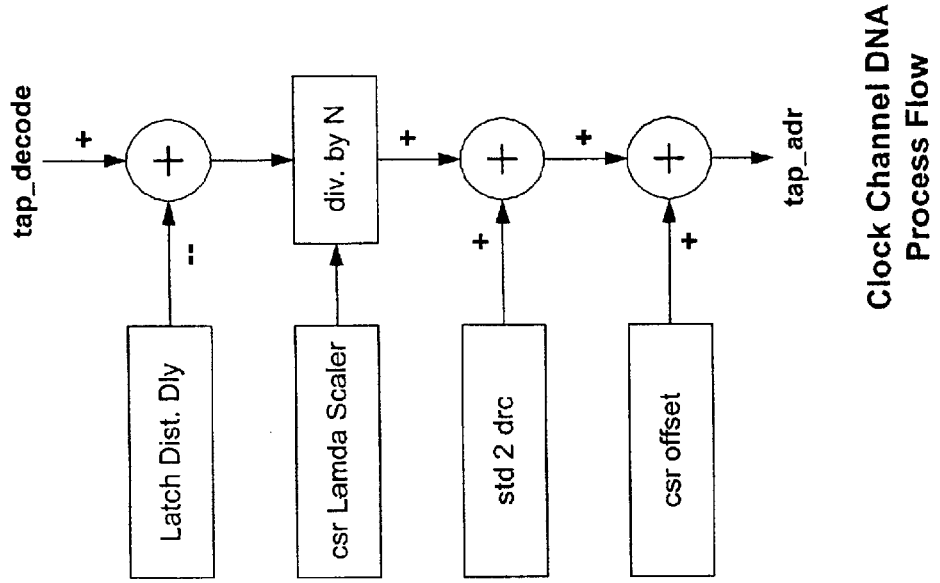

Considered in more detail, in the Clock Channel front-end block 700, the assertion of train_strt1 deactivates the phs_adj_done signal while enabling a clock signal std_lnk_clk to its state machine 860. Signal phs_adj_done is broadcast as mod_clk_adj_done to all DSC Data Channels 610-0, 610-1, 610-2, 610-3, . . . of the DSC Module 350. When asserted, the phs_adj_done (mod_clk_adj_done) signals permit the DSC Data Channel front ends to complete their training sequences. Once activated, the state machine asserts its meas_strt signal to create a meas_pulse signal at the input of a Delay Line 840. On the next clock cycle, a signal meas_cntl is asserted, capturing the clock period measurement in the Clock Image Latch 800 shown in FIG. 8 and terminating meas_pulse one clock cycle later, returning to the normal link clock waveform. The clock image word is an N-bit word representing the clock period of the received link clock signal in terms of delay taps or simply "taps". A "one-hot" decode of the clock image word is performed by Image Decode Logic 810 which locates the tap of the first 1-to-0 transition, representing the period of the link clock signal. A String-to-Binary Encoder circuit 820 converts the "one-hot" tap location to a binary value and generates a tap_decode vector. The tap_decode vector output of the String-to-Binary Encoder circuit 820 is a binary value of the link clock period that is processed further by a DNA logic block 830 to generate the final tap_adr signals. The DNA logic block 830 performs a set of arithmetic operations on the tap_decode vector to arrive at the final tap_adr value. As shown in FIG. 29A, in a first and second operation the binary value of the Clock-Image-Latch distribution delay is subtracted from the tap_decode vector, and then the adjusted value is right-shifted two positions to derive a divide-by-four value. In a third operation a balance delay value is added to results of the divide-by-four operation to produce the final tap_adr value. The balance delay value is required to align the edges of the drc_lnk_clk and std_lnk_clk clock signals. The clock channel completes its portion of the WTS operation with the assertion of a phs_adj_done signal (mod_clk_adj_done) shown in FIG. 8. Signal phs_adj_done (mod_clk_adj_done) is asserted a sufficient number of clock cycles after meas_cntl assertion to assure that all DSC Data Channels 610-0, 610-1, 610-2, 610-3, . . . have enough time to restart their data recovery string to detect the SSM byte.

Figure 8:
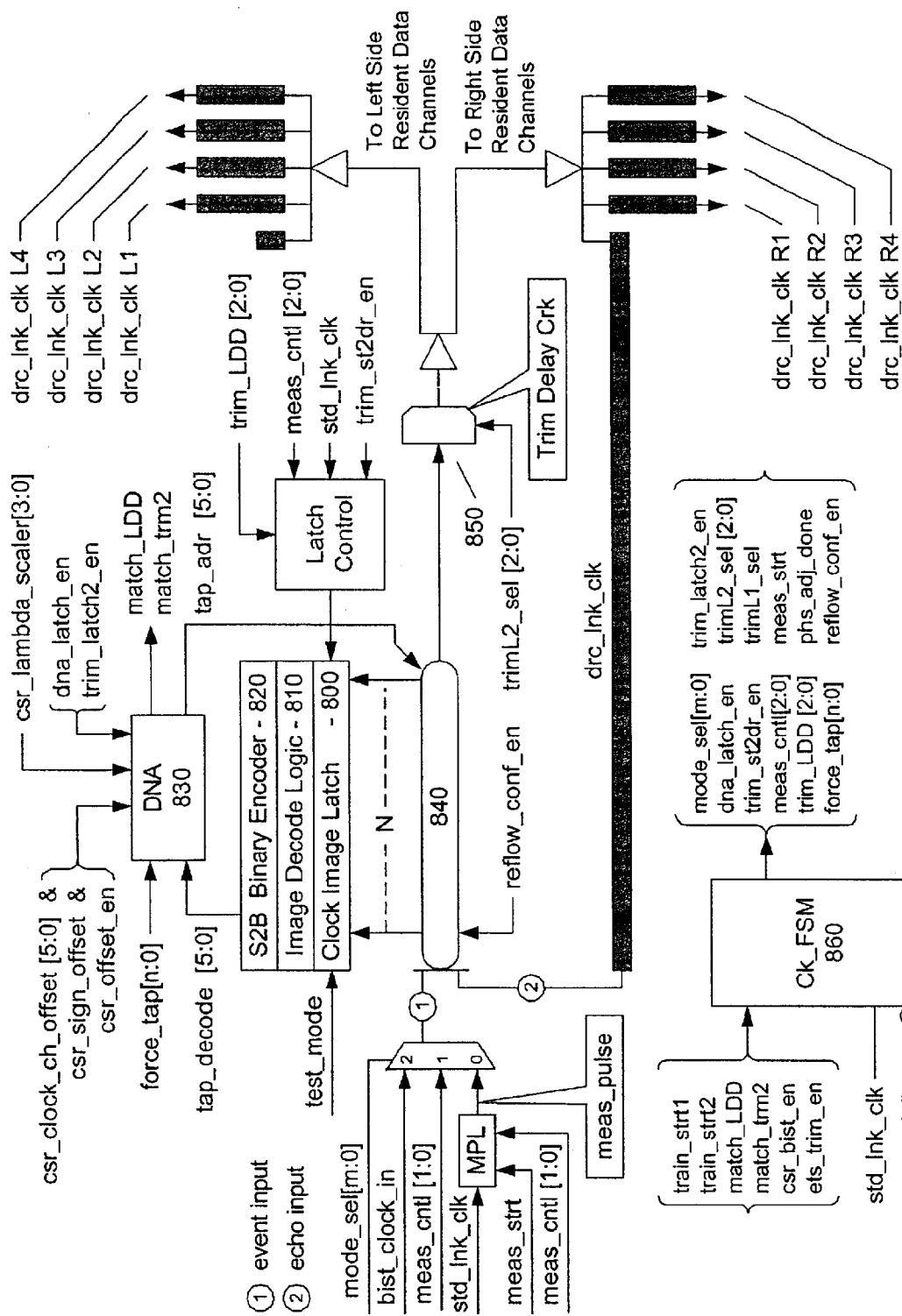
FIG. 8 is a detailed functional block diagram of the DSC clock channel front-end logic and circuitry shown in FIG. 7 and hierarchical signals.

For purposes of testing, the final tap_adr value can be further modified by adding or subtracting a registered offset value, a csr_clock_ch_offset vector value, and/or changing the value of the csr_lambda_scaler vector shown in FIG. 8 and FIG. 29A to change the default divide-by-four factor to another predefined value. A divide-by-four factor is the preferred csr_lambda_scaler value that centers the clock edge in the bit period while minimizing sampling and edge placement calculation errors.

A detailed description of the data channel operation during a warm training sequence will now be provided. In the DSC Data Channel front-end 910, the assertion of train_strt1 deactivates local signal phs_adj_done and enables clock signal std_lnk_clk_b to its state machine 1000 shown in FIG. 10. Deactivation of phs_adj_done forces signals pos_data_bit and neg_data_bit to a zero value. Once activated, the Data Channel FSM 1000 sets the value of vectors mode_sel and trim_c2d_sel and asserts a signal reflow_conf_en. The value of the mode_sel vector selects the lnk_data_in signal of the data channel input multiplexer while the trim_c2d_sel vector selects the minimum sub-tap "padding" delay. The assertion of the signal reflow_conf_en enables the "re-flow" measurement configuration. The "re-flow" measurement configuration causes the signal applied the "event input" of the Delay Line 1070 to be routed the to the output of the delay line without passing through the delay stages of the delay line. A second signal applied to the "echo input" is routed to pass through the delay stages of the Delay Line, but is blocked from the output of the delay line. Hence, a delay image of the signal applied to the "echo input" can be recorded while a signal applied to the "event input" simultaneously passes through the input and output circuitry of the Delay Line 1070 bypassing the delay stages.

Figure 10:
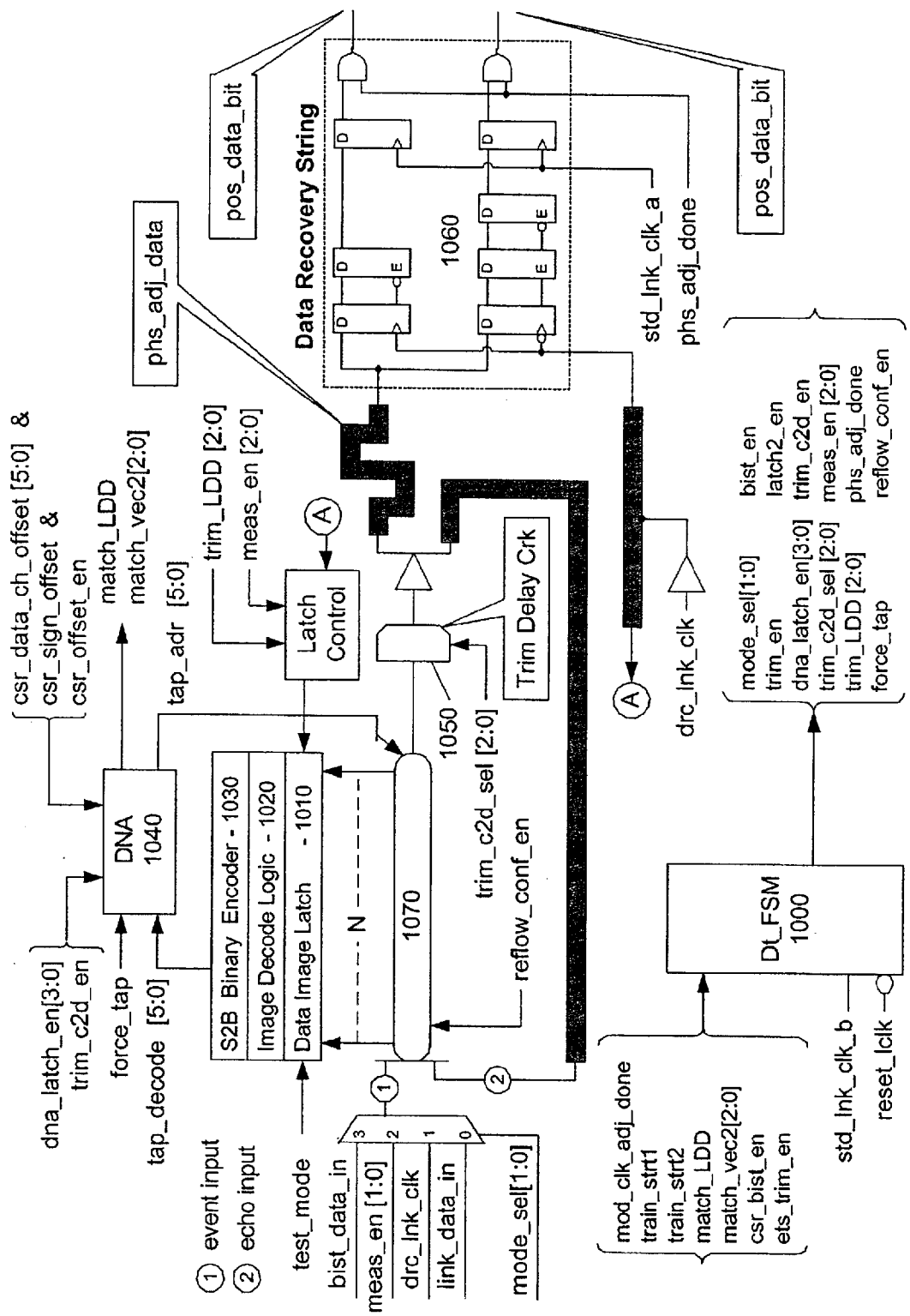
FIG. 10 is a detailed functional block diagram of the DSC data channel front-end logic and circuitry shown in FIG. 9 and hierarchical signals.
Figure 30:
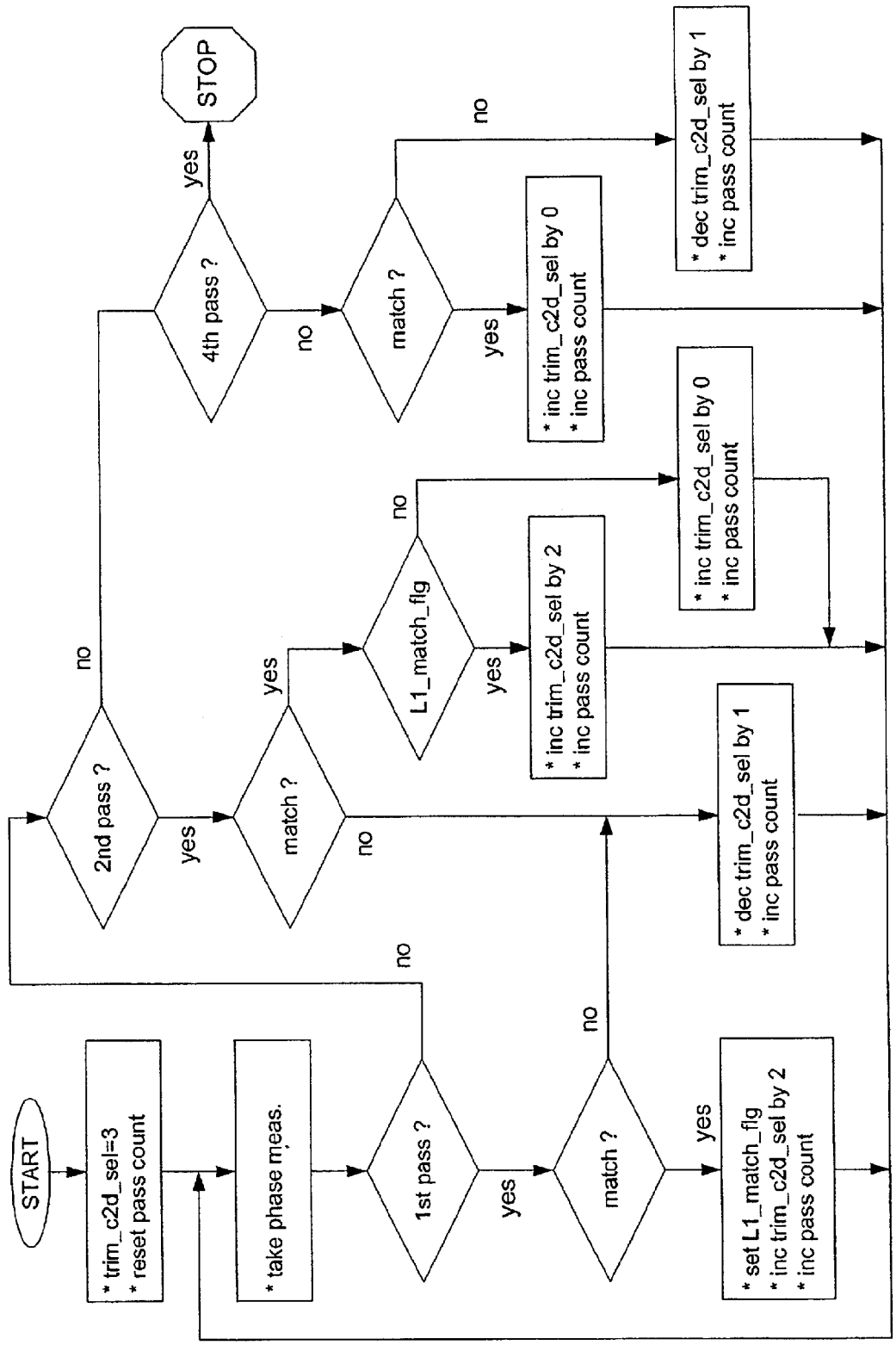
FIG. 30 shows a modified binary search algorithm to determine the trim_c2d_sel vector which will reduce the residual phase error to a value of less than one 1/n of a tap delay. The "n" represents the resolution of the sub-tap delay value.
Figure 31:
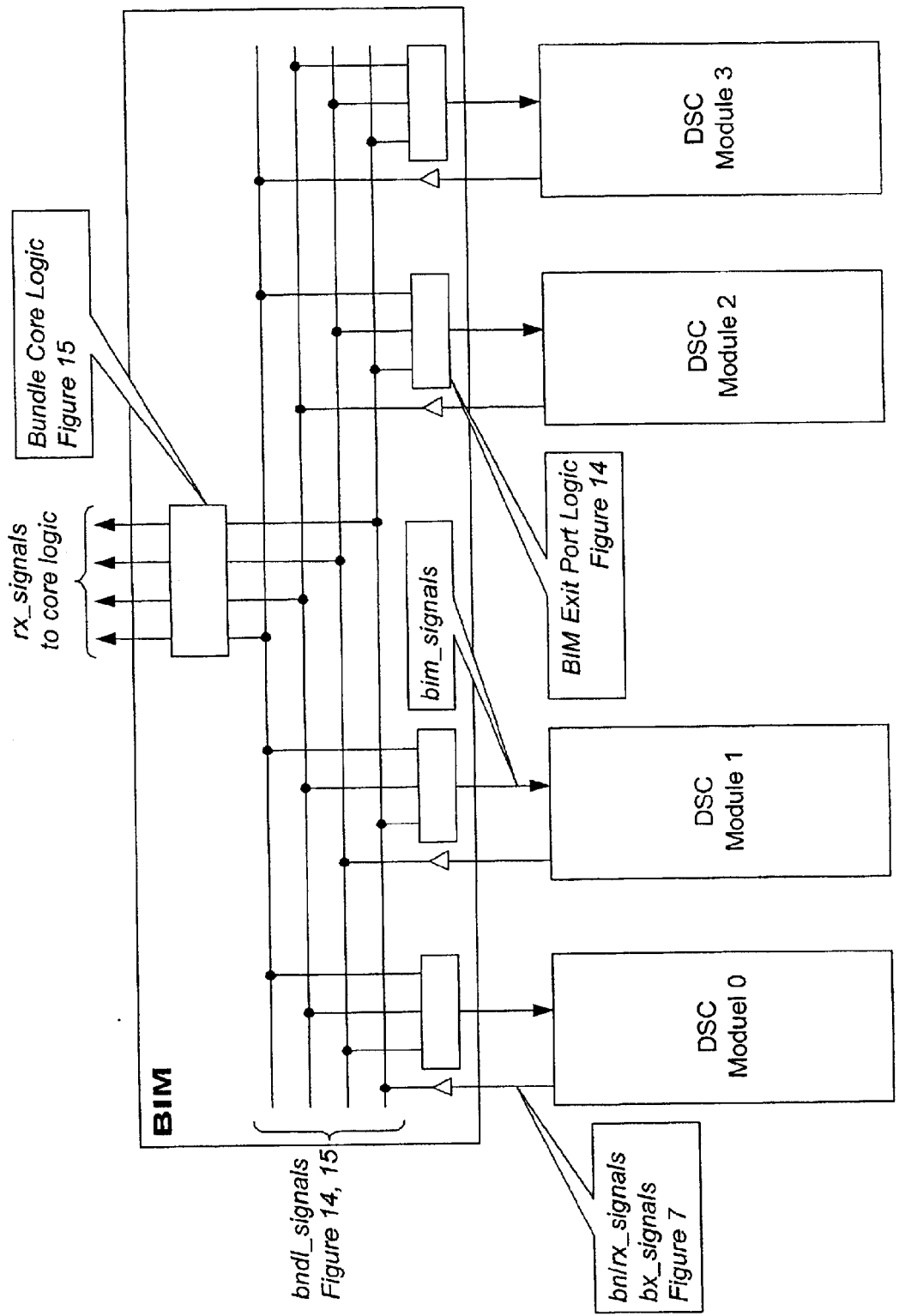
FIG. 31 is a top-level block diagram representation of a bundle of four DSC Modules connecting to a BIM and depicting the interconnecting signaling hierarchy.

A signal meas_en is asserted by the FSM 1000 capturing a data phase word in a Data Image Latch 1010 on the next rising edge of the link clock std_lnk_clk. It is important to note that the capture of a data phase word is referenced to the link clock std_lnk_clk that represents drc_lnk_clk with zero offset. Hence, the data phase word represents the phase relationship of the data stream to the data-recovery link clock drc_lnk_clk with an offset value of zero. The data image word is an N-bit word representing the phase error of the received link data signal in terms of delay taps or simply "taps". A "one-hot" decode of the data image word is performed by Image Decode Logic 1020 which locates the tap position of the first 1-to-0 transition, when data_image_latch[0] equals one, or the 0-to-1 transition, when data_image_latch[0] equals zero. A String-to-Binary Encoder circuit 1030 converts the "one-hot" tap location to a binary value and generates the tap_decode vector shown in FIG. 10. The FSM 1000 saves the initial tap_decode vector in a DNA register and initiates a modified binary search algorithm as shown in FIG. 30 to determine the trim_c2d_sel vector which will reduce the residual phase error to a value of less than one 1/n of a tap delay. The "n" represents the resolution of the sub-tap delay value. The tap_decode vector output of the String-to-Binary Encoder circuit 1030 is a binary value of the link data phase error that is processed further by a DNA logic block 1040 to generate the final tap_adr signals, as shown in FIG. 10. For purposes of testing, the final tap_adr value can be further modified by adding or subtracting a registered offset value, a csr_data_ch_offset vector. The DNA logic block 1040 performs a set of arithmetic operations on the tap_decode vector to arrive at the final tap_adr value. As shown in FIG. 29B, in a first and second operation the binary value of the Data-Image-Latch distribution delay is subtracted the from the tap_decode vector, and the balance delay value that is required to align the edges of the drc_lnk_clk clock and phs_adj_data signals is added to arrive at the final tap_adr value. The signal phs_adj_done is asserted a sufficient number of clock cycles after meas_en is asserted to assure that phase-corrected data has propagated through a Data Recovery String 1060. When all data channels within the DSC Module 350 have completed their phase correction sequence, the DSC Clock Channel 610 deactivates the mod_clk_adj_done signal to begin is training sequence. When deactivated, signal mod_clk_adj_done deactivates the phs_adj_done signals for all data channels within the DSC Module 350.

Figure 9:
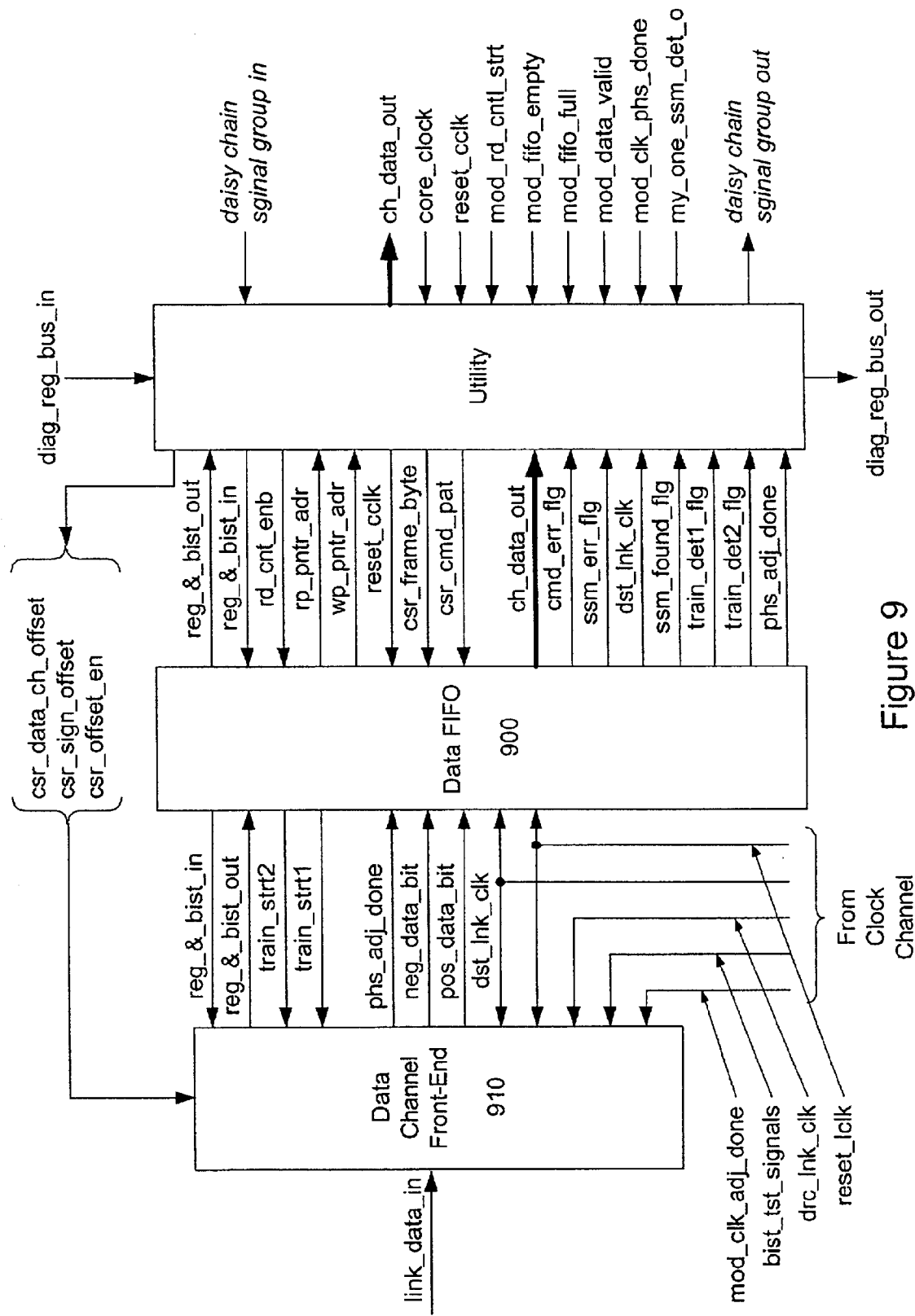
FIG. 9 is a detailed block diagram of an exemplary DSC data channel shown in FIG. 6 having a data channel front-end logic and circuitry block, data FIFO block, and utility block to interface to the clock channel within the DSC Module and to either the BIM or host core logic.

When the clock channel has completed its training sequence, it asserts signal mod_clk_adj_done allowing the data channels to assert their phs_adj_done signals. Signal mod_clk_adj_done is asserted with sufficient time for the data channels to assert their phs_adj_done signals to initialize the Data Recovery String 1060. Assertion of phs_adj_done signals indicates the end of the data channel phase correction sequence and enables data output signals neg_data_bit and pos_data_bit to the Data FIFO block 900 shown in FIG. 9.

Referring again to FIG. 11, in the Data FIFO block 900, the assertion of train_strt1 resets an SSM Start Sequencer 1130 and activates its std_lnk_clk. Reset of the SSM Start Sequencer 1130 also deactivates a signal train_mode, forcing a Write Pointer 1140 to a zero value. Hence, during a WTS operation, only Data FIFO Register File 1170 location zero is selected.

The neg_data_bit and pos_data_bit streams are written into the Data FIFO stack 1170 on the rising edge of std_lnk_clk. The Data FIFO stack 1170 is preferably implemented as an addressable "write-pre-bit" FIFO to minimize power dissipation. The Data FIFO write address, fifo_bit_adr, from a FIFO Address Encoder 1150 is derived from the Write Pointer 1140 and the Frame Bit Counter logic block 1160 along with the state of a signal pos_pattrn_flg. The pos_pattrn_flg signal from the Pattern Search FSM 1120 is a logical one if the positive bits of the Data FIFO stack 1170 all have a value of logical one, otherwise signal pos_pattrn_flg is a logical zero. The FIFO read and write order is altered depending on the state of pos_pattrn_flg to maintain proper byte framing due to negative phase alignment of the data stream from the DSC Data Channel front-end block 910. The fifo_bit_adr is updated with the state of pos_pattrn_flg upon the deactivation of the train_mode signal during the SSM byte.

With the assertion of train_mode and phs_adj_done, the Pattern Search FSM 1120 begins SSM and training fence pattern searches. During normal operation, signal phs_adj_done will be deactivated when the clock channel enters into its training sequence and reactivated once the clock channel has completed its training. During the period of phs_adj_done signal deactivation the Pattern Search FSM 1120 suspends its search for the SSM byte and training fence pattern and resumes its search once phs_adj_done has been asserted. If after two transitions of frame_inc the training fence pattern has not been detected, a signal ssm_err_flg is asserted. Waiting two frame_inc transitions assures that the DSC Data Channel front-end block 910 has had time to phase-adjust the data stream to be properly sampled. The SSM search continues, and a signal ssm_found_flg is asserted once the SSM pattern has been detected. If a non-training fence pattern or non-SSM patterns are detected during this time, the ssm_err_flg signal is asserted, ending the SSM search. The states of the ssm_found_flg and ssm_err_flg are maintained upon the deactivation of the train_mode signal.

The states of the ssm_found_flg and ssm_err_flg signals are fed to the DSC Clock Channel 600 and used internally by the DSC Data Channels 610-0, 610-1, 610-2, 610-3 . . . , as well. The DSC Clock Channel 600 processes these signals and broadcasts the results to all DSC Data Channels 610-0, 610-1, 610-2, 610-3 . . . within the DSC Module 350, as well as to other DSC Modules within the bundle. Internal to the DSC Data Channel 610, these signals are used by the SSM Start Sequencer logic 1130 shown in FIG. 11 that sets the proper byte framing.

The SSM Start Sequencer 1130 aligns and initializes the Write Pointer 1140 and Frame Bit Counter 1160 to properly frame the data byte. This procedure assures that the first data bit received after the warm training sequence is written to Data FIFO stack 1170 location zero. Upon the assertion of the ssm_found_flg signal, the SSM Start Sequencer 1130 asserts a frame_init signal, while deactivating a frame_strt signal, as shown in FIG. 11. The frame_init signal forces the Frame Bit Counter 1160 to a zero value to generate a fifo_bit_adr vector of zero at which the first data bit will be stored. The Write Pointer 1140 and Frame Bit Counter 1160 are held at this initial state until the SSM Start Sequencer 1130 asserts frame_strt two UI from the end of the SSM byte to start the Frame Bit Counter 1160. The SSM Start Sequencer 1130 deactivates the train_mode signal at the end of the SSM byte. In the case of an SSM error, an ssm_err_flg signal is asserted and used as part of a process to observe error-framed data where the DSC Data Channel 610 outputs data though it is incorrectly framed, allowing the system to diagnose the error condition.

Logic to generate the fifo_bit_adr vector is comprised of the Write Pointer 1140, Frame Bit Counter 1160, and FIFO Address Encoder 1150 logic blocks. As mentioned earlier, the Data FIFO stack 1170 is preferably implemented as a "write-per-bit" where each bit of data is written to a particular bit location pointed to by the fifo_bit_adr vector. The frame_adr and wr_pntr_adr vectors are used by the FIFO Address Encoder 1150 logic to generate the fifo_bit_adr vector. The Frame Bit Counter 1160 is sized for two-byte count intervals, which aligns double frames on an integer number of link clock cycles. Although not required for fifo_bit_adr vector generation, the write pointer is sized to match the read pointer, which reduces the logic needed for Data FIFO status calculations. The least significant portion (or LSB) of the wr_pntr_adr vector is not used by the FIFO Address Encoder 1150 to generate the fifo_bit_adr vector, thus requiring the write pointer to be incremented twice. This requires the Frame Bit Counter 1160 to assert a frame_inc signal to increment the Write Pointer 1140 value on each byte time interval. It should be noted that intermediate increment values of the write pointer do not affect the fifo_bit_adr vector, but they allow for read-to-write pointer tracking. Configuration of the Write Pointer 1140 and Frame Bit Counter 1160 in this way accommodates an odd-numbered encoding scheme (for example, 8b9b) having reduced design complexity.

Figure 14:
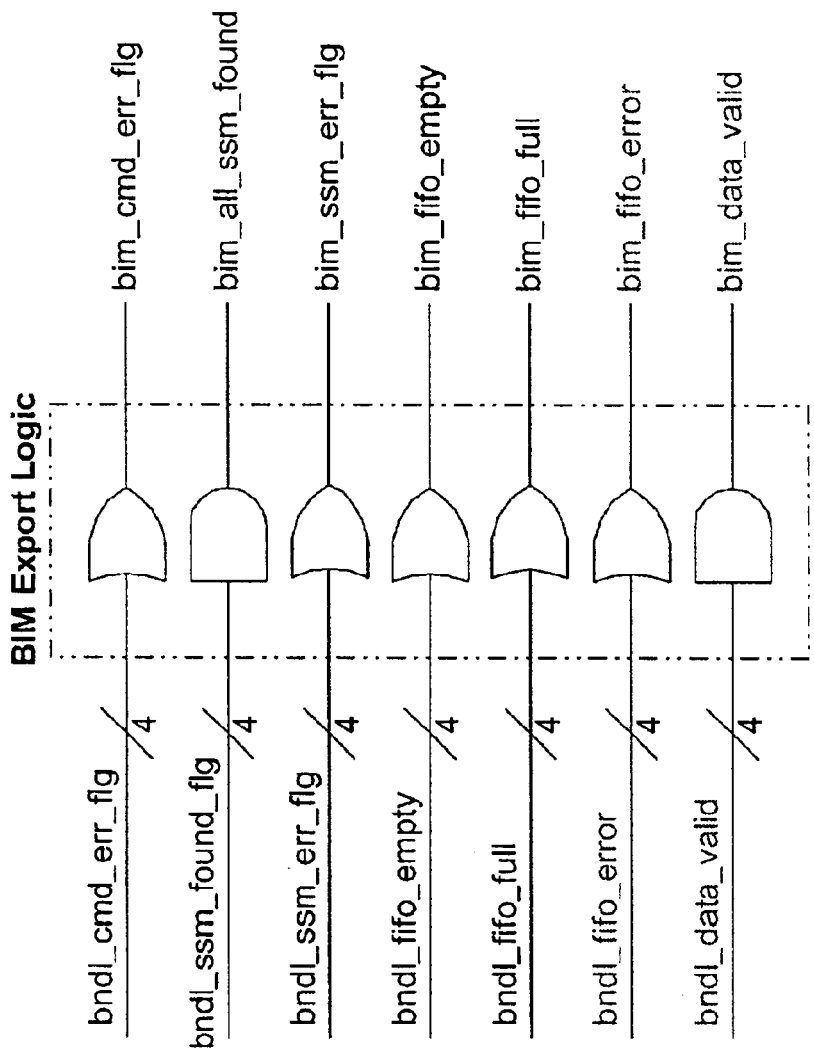
FIG. 14 is a block diagram of a logic representation of BIM logic for signals not requiring re-timing and synchronization. These signals are referenced to the slower core clock frequency.
Figure 15:
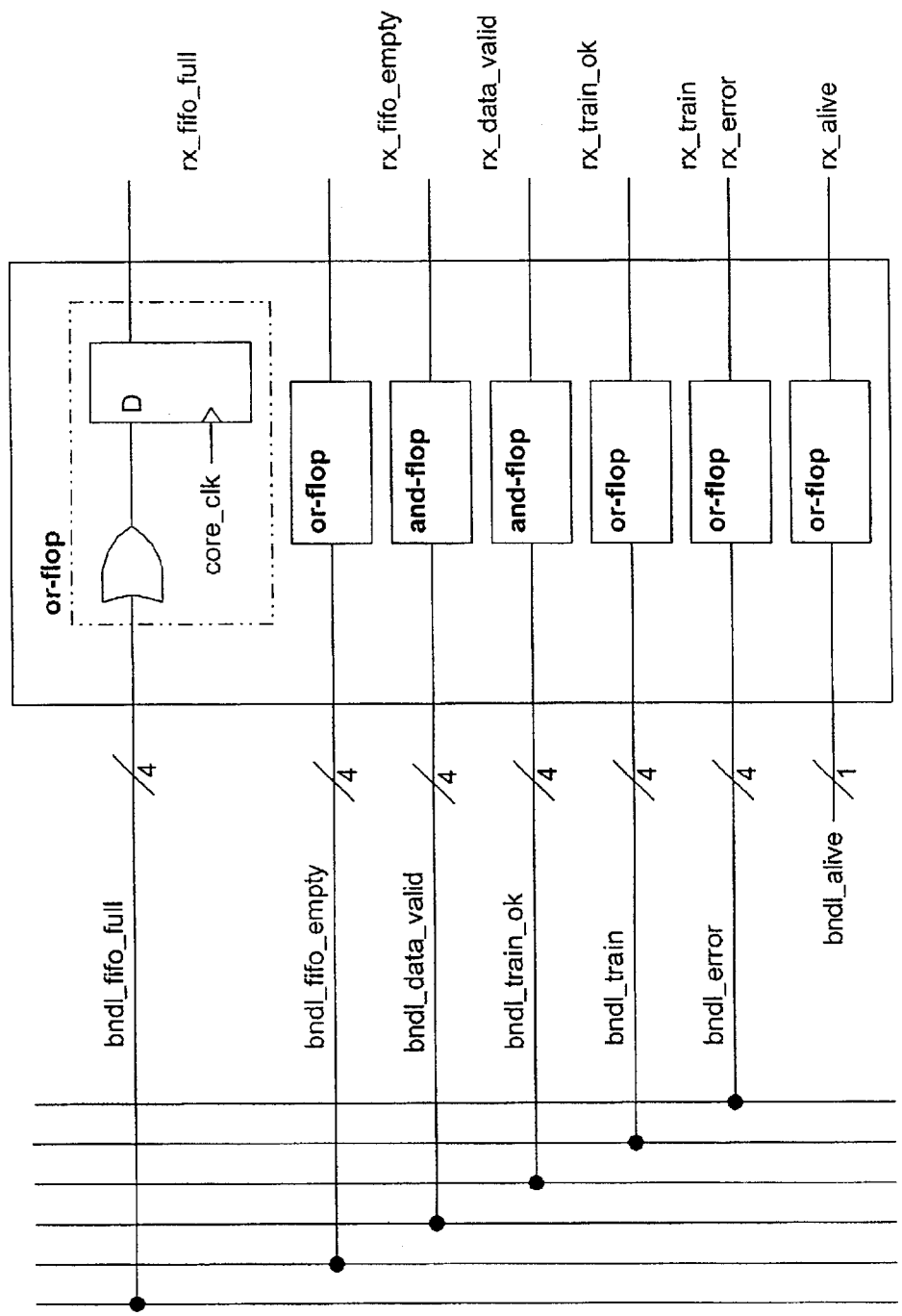
FIG. 15 is a block diagram of an interface between the bundle logic and the core logic and illustrates the hierarchical interface signals between the DSC bundle and the core logic of a host ASIC.
Figure 16:
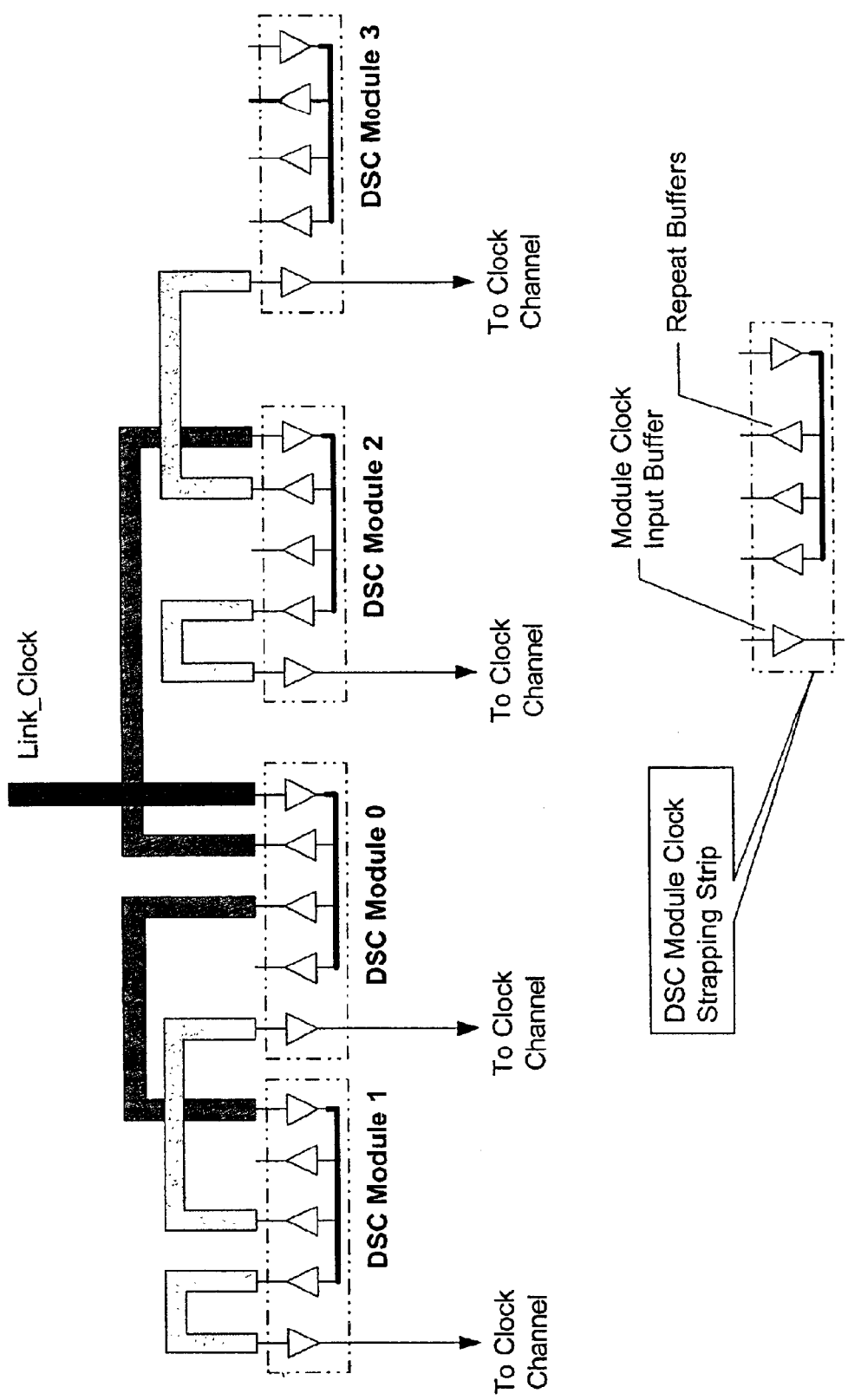
FIG. 16 is a block diagram of the link clock strapping showing an exemplary implementation for the distribution link clock signal utilizing the "clock-strapping" method. Also shown is a DSC Module Clock Strapping Strip module on the "link end" of each DSC Module consisting of an input buffer that drives a fan-out buffer of three. A Module Clock Input Buffer functions to receive the clock signal and drive that signal into the clock channel of the DSC Module. The link clock signal is connected to the fan-out input pin only. First-level fan-out link clock signals from DSC Module 0 are connected to the fan-out ping pins of DSC Modules 1 and 2 using metal segments of equal dimensions. A first set of second-level fan-out link clock signals from DSC Module 1 connects to the Module Clock Input Buffer pin of DSC Modules 1 and 0. A second set of second-level fan-out link clock signals from DSC Module 1 connects to the Module Clock Input Buffer pin of DSC Modules 2 and 3. The interconnect metal for this second level of fan-out link clock signals is of equal dimensions.
Figure 17:
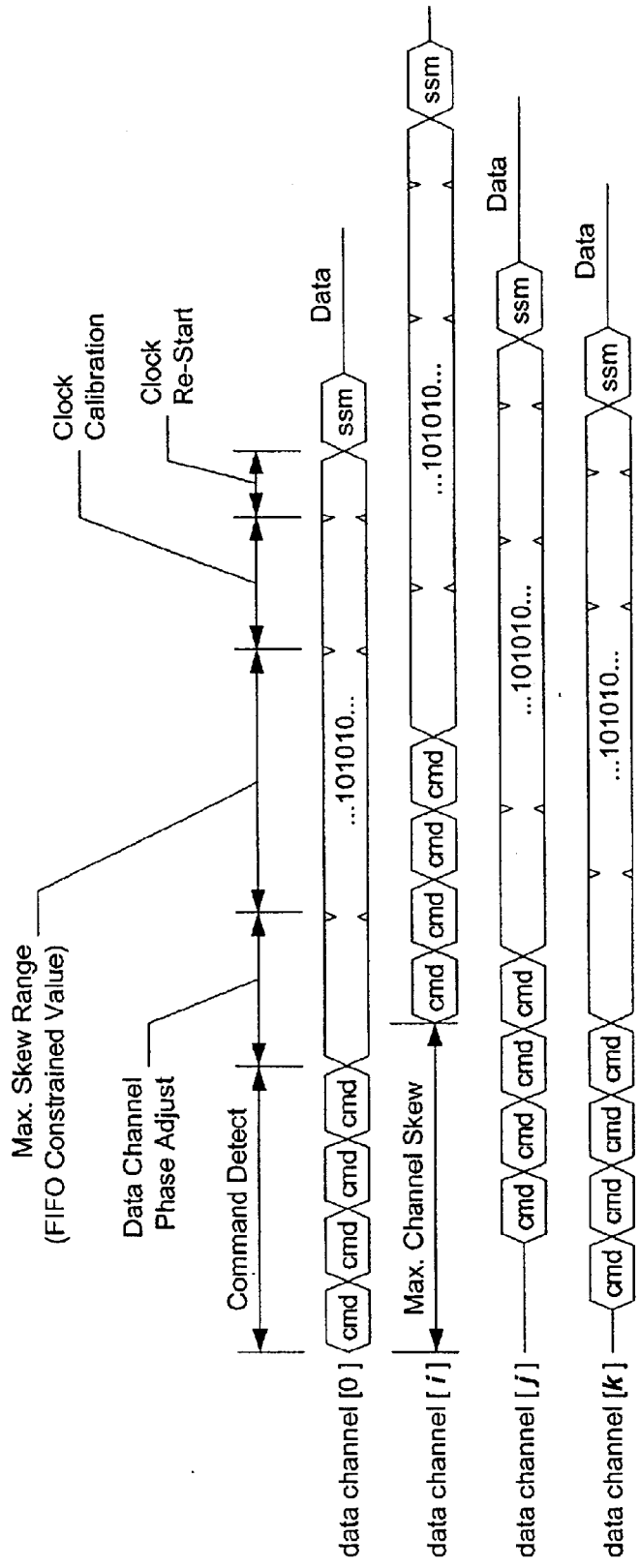
FIG. 17 is a top-level skew range timing diagram showing the warm training sequence traffic across four data channels 0, i, j, and k. Depicted is the maximum skew range allowed of greater than four bytes (e.g., a minimum of 40UI for an 8b10b encoding scheme and 32UI for non-AC-encoded protocols) contained within the command detect segment. Segments also depicted are the Clock Calibration, Data Channel Phase Adjust, Clock Re-start, and word framing segments. System data immediately follows the training sequence on all four data channels.
Figure 18:
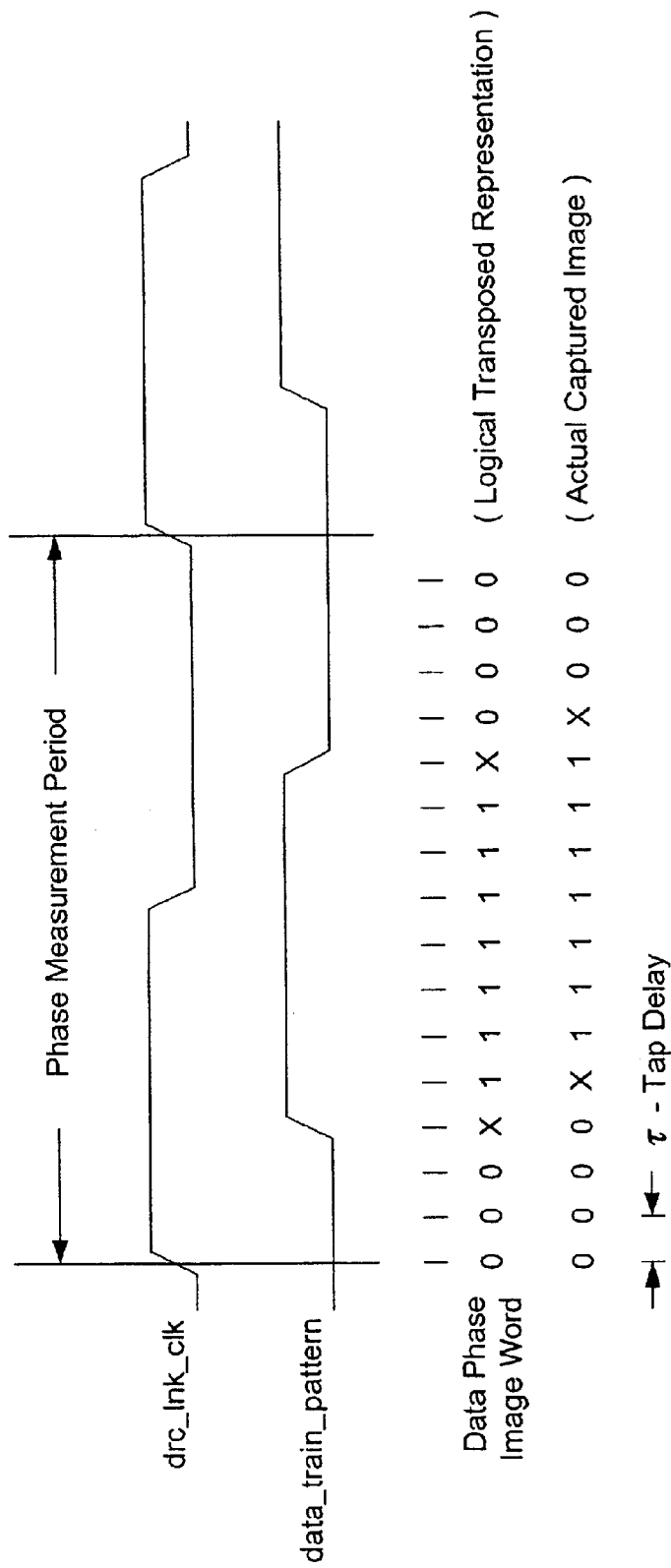
FIG. 18 is a timing diagram of the data channel's measurement period of the data-training pattern (data_train_pattern) referenced to the data-recovery link clock (drc_lnk_clk). Also shown is the captured Data-Phase-Image-Word view of the logical transposed representation and how the Data Image Word actually appears.
Figure 19:
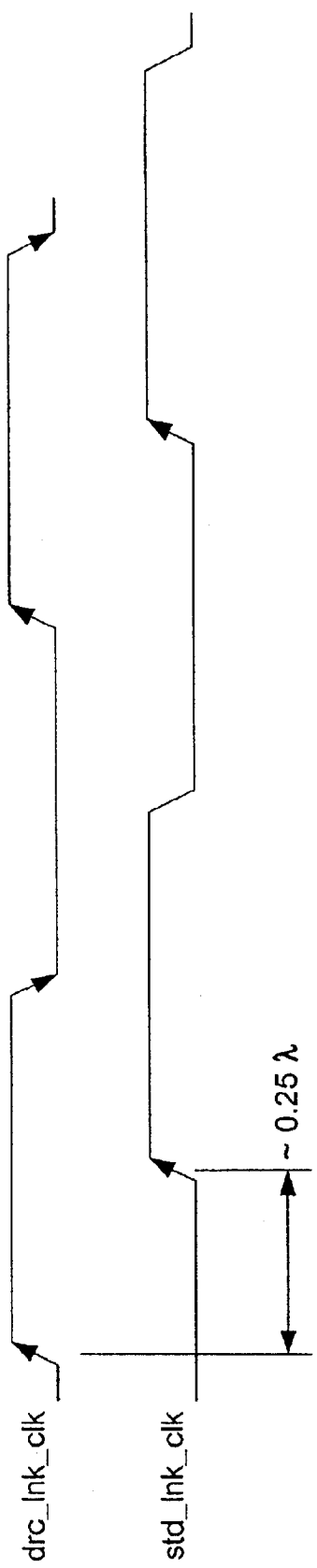
FIG. 19 is a timing diagram showing the timing relationship of the data-recovery link clock (drc_lnk_clk) to the standard link clock (std_lnk_clk) used throughout the deskewing circuit.
Figure 20:
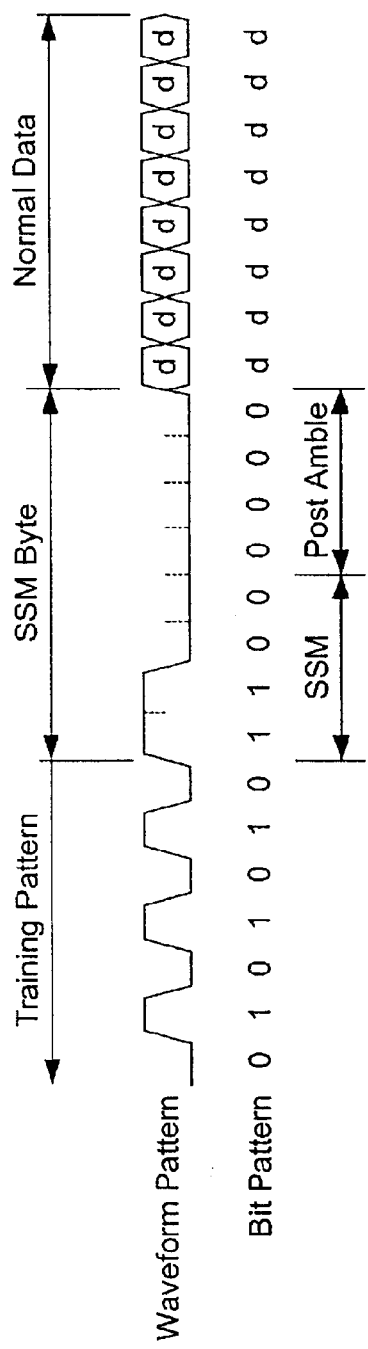
FIG. 20 is a timing diagram for the SSM byte showing the preceding fence pattern of the training sequence, the SSM byte consisting of the SSM pattern, and post-amble followed by system data.
Figure 21:
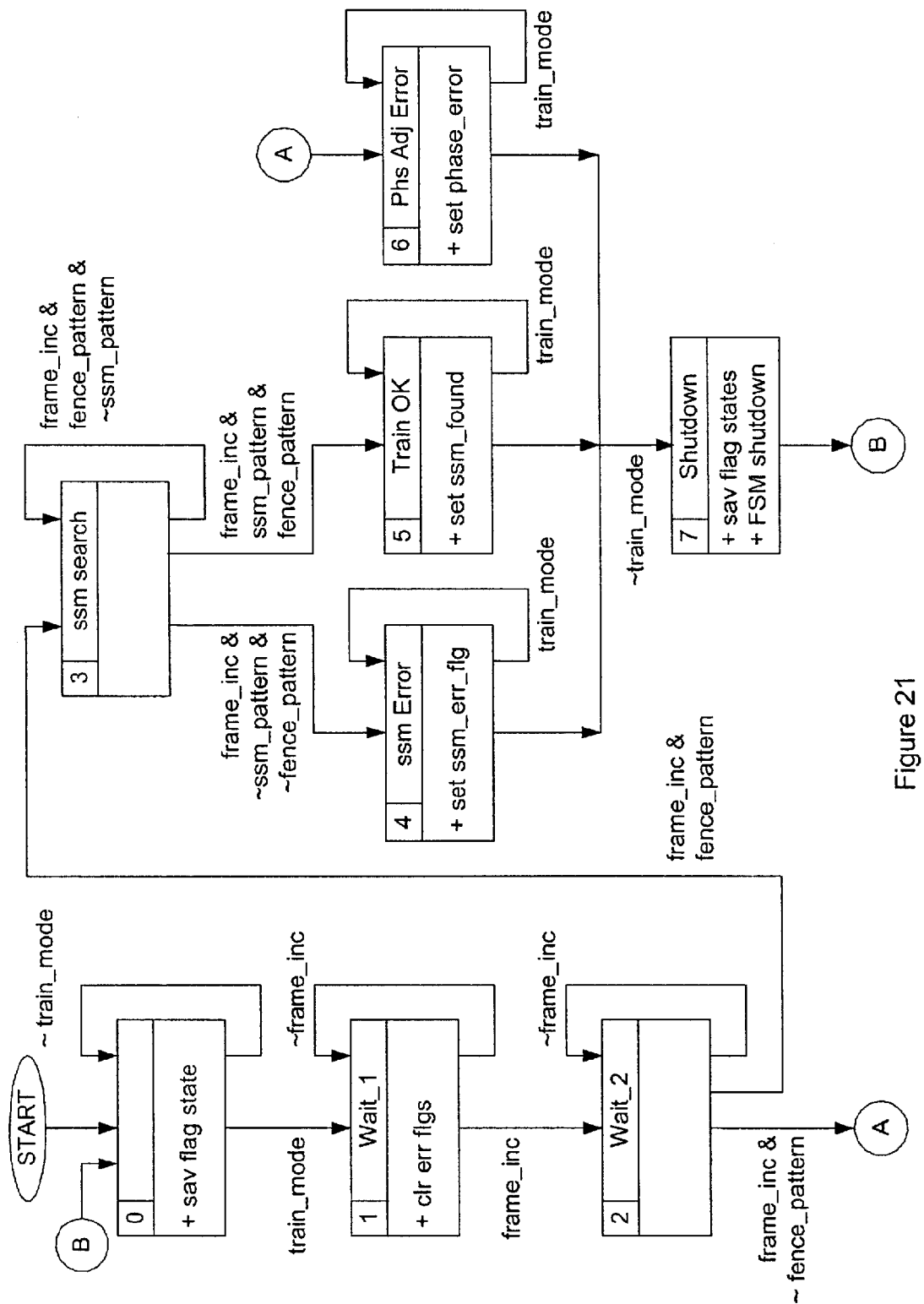
FIG. 21 is a state flow diagram of the SSM pattern search algorithm used during typical training sequences to detect the SSM pattern. A first phase of the search algorithm is to detect the training fence pattern, which is started after a waiting period of two frame_inc cycles. If no fence pattern is detected, the search terminates and escapes to an error state, and a phase_error signal is set. If the fence pattern is detected, the algorithm begins searching for the SSM pattern. An SSM error is assumed if neither a fence nor SSM pattern has been detected for one cycle of the frame_inc signal, causing the algorithm to exit to an error state setting the ssm_err_flg signal. If an SSM pattern is detected, the algorithm escapes to the "Train Ok" state asserting the flag signal ssm_found. The algorithm remains in the "Train Ok", "Phs Adj Error", or "SSM Error" state while signal train_mode remains asserted. The algorithm exits to the "Shutdown" state saving all flag states and deactivating the clock to the SSM search sequence logic.
Figure 22:
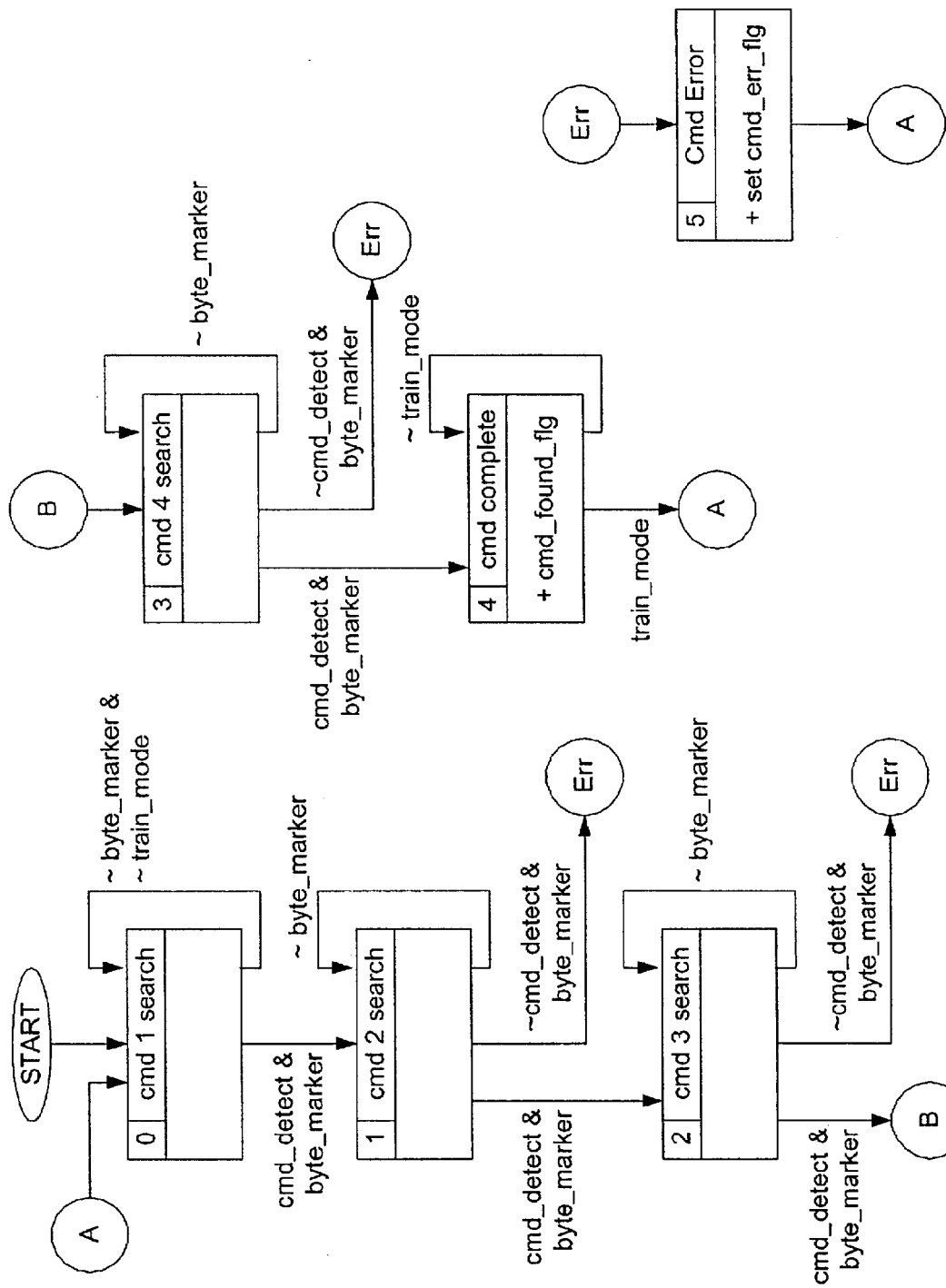
FIG. 22 is a state flow diagram of the command pattern search algorithm used for warm training and extended training command bytes. This particular algorithm searches for four consecutive warm training bytes or four consecutive extended training bytes. It is designed to exit if four consecutive command bytes are not detected and resume the search from the beginning.

The DSC Clock Channel 600 receives ssm_found_flg and ssm_err_flg signals from all DSC Data Channels 610-0, 610-1, 610-2, 610-3, ... within the DSC Module 350, as shown in FIG. 11. As shown in FIG. 26, a bim_all_ssm_found signal is the logical "AND" of all ssm_found_flg signals from the DSC Data Channels 610 and is synchronized to the core clock domain before it is broadcast to all DSC Modules 350-0, 350-1, ... 350-N within the bundle via the BIM 360. A bim_ssm_err_flg signal is the logical "OR" of all ssm_err_flg signals from the DSC Data Channels 610 and is synchronized to the core clock domain before it is broadcast to all DSC Modules 350 within the bundle via the BIM 360. Each DSC Module 350 in the bundle receives the broadcast signals bim_ssm_err_flg and bim_all_ssm_found via the export port of the BIM, as shown in FIG. 14. The module-level FIFO Control in the utility block of the DSC Clock Channel 600 shown in FIG. 27 receives these signals and generates a mod_rd_cnt_strt signal that is broadcast to all DSC Data Channels 610 in the DSC Module 350. The mod_rd_cnt_strt signal is the logical "OR" of bim_ssm_err_flg and bim_all_ssm_found signals. The assertion of the mod_rd_cnt_strt signal marks the end of the warm training sequence and the start of normal operation.

The cold training sequence (CTS), which provides a method to initiate a DSC training sequence without the requirement of correctly sampling link data, will now be described in detail. Cold training sequences are required at system power-up, system reset, or in the case of unrecoverable link errors. Cold training sequences are a super-set of warm training sequence (WTS) operations having a first segment pertaining to delay path matching/calibration and a second segment of link skew compensation, as performed during a warm training sequence. CTS operations function as a link reset causing the DSC Modules 350-0, 350-1, ... 350-N to reset and clear all calibration values obtained during previous training sequences and precipitate an immediate re-train. A cold training sequence is initiated by stopping the link clock switching by holding the link clock signal at either a logical one or zero state for a minimum specified amount of time to assure detection by all DSC Modules 350-0, 350-1, ... 350-N. CTS operations can be initiated at any time. In accordance with one modification of the present invention, alternative methods include slowing the link clock frequency or providing a non-fence pattern on the link clock channel. Any of these methods produces a detectable "link-reset signature" to initiate CTS operation. However, doing so invalidates any received data being processed by the DSC Modules 350-0, 350-1, ... 350-N at the time.

Once CTS operation has started, the DSC Modules 350-0, 350-1, ... 350-N begin path delay matching/calibration, hereafter referred to as "trimming". Preferably, trimming is first completed in the DSC Clock Channels 600 followed by all Data Channels 610. Only after the trimming process has completed is skew compensation of the link initiated.

DSC Clock Channel 600 delay trimming is a two-stage process. The first stage provides delay compensation for a Clock Image Latch 800 distribution, and the second stage is path-delay matching of clock signals drc_lnk_clk (data-recovery link clock) and std_lnk_clk (standard link clock). Similar operations occur in the DSC Data Channels 610. First, delay compensation for the Data Image Latch 1010 distribution is performed, and, second, the path-delay matching of phase-adjusted data to the data-recovery link clock drc_lnk_clk is performed. In practice, the Data Image Latch 1010 distribution delay trimming for both clock and DSC Data Channels 610 is performed concurrently to reduce the time required for training. The delay-path match trimming between the clock signals drc_lnk_clk and std_lnk_clk must be completed in the DSC Clock Channel 600 before the DSC Data Channels 610 complete the trimming process. In all cases, trimmed delays are required to achieve an optimal accuracy of less than one-eighth of one tap delay. Once all trimming operations have completed, the previously described normal warm training sequence operation is initiated as the final operational phase of the CTS.

Figure 5:
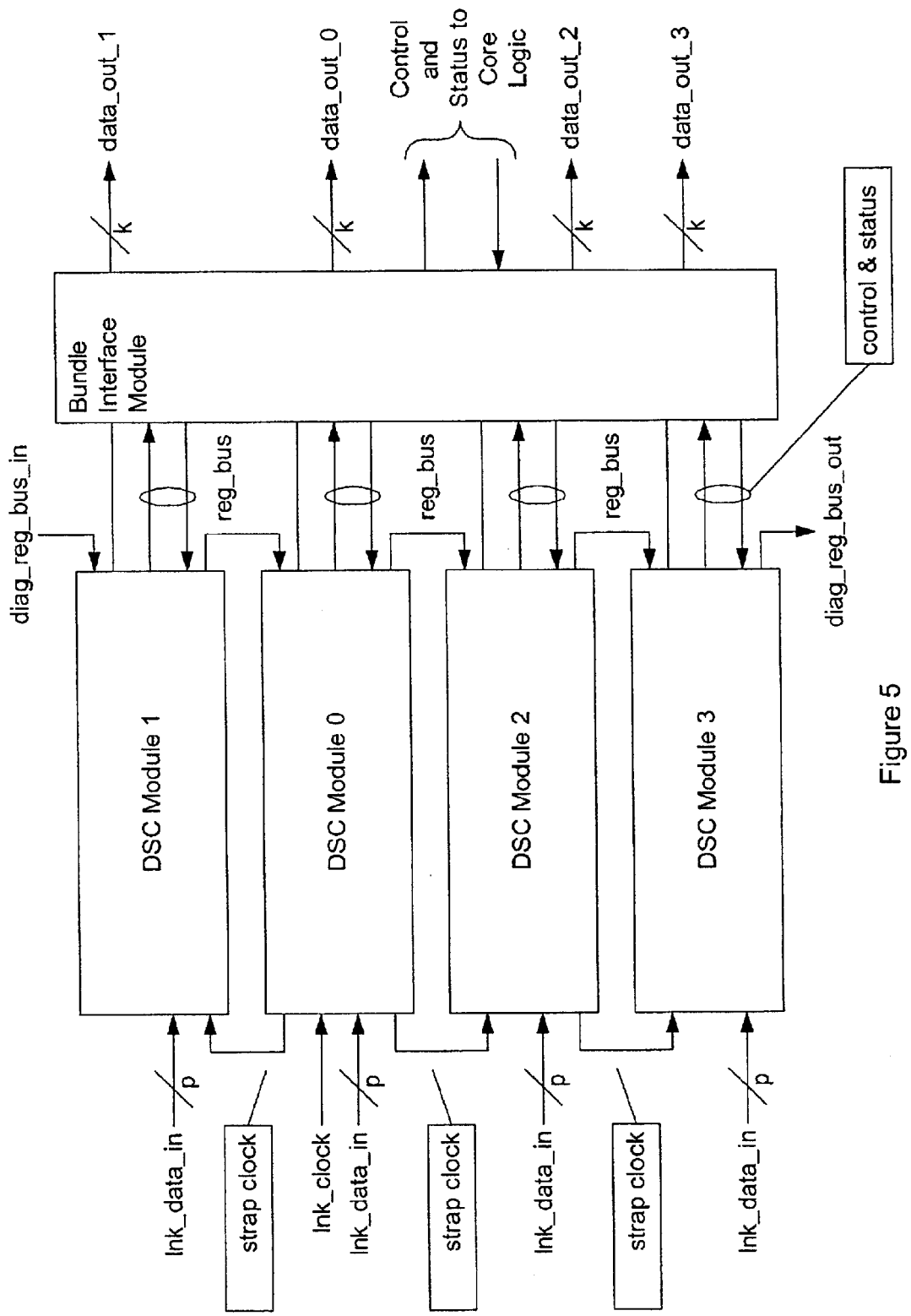
FIG. 5 is a detailed block diagram of the DSC bundle shown in FIG. 4 comprising a plurality of DSC Modules, for example, four modules, and a BIM with hierarchical signals.
Figure 24A:
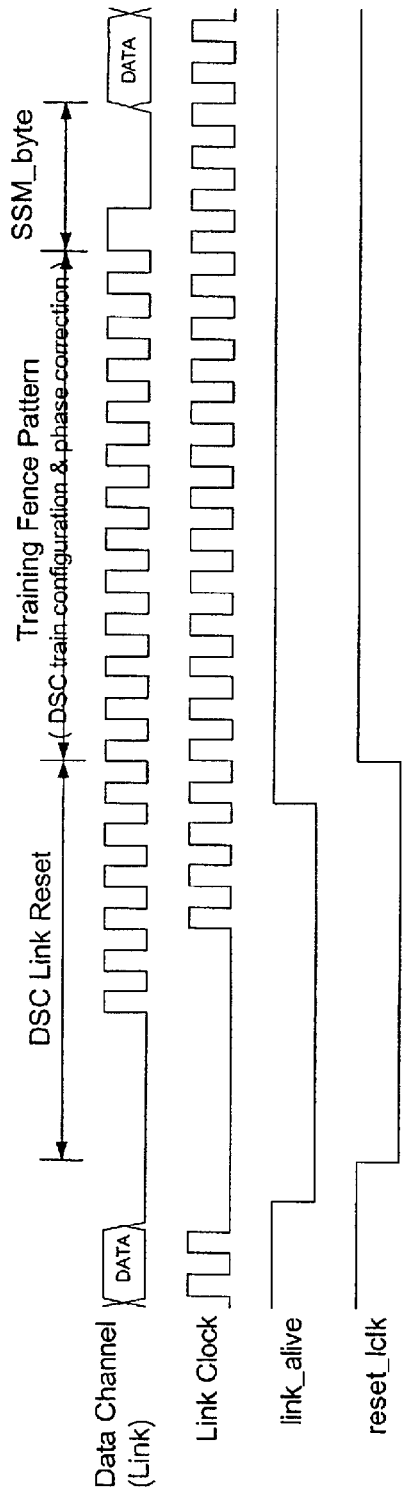
FIG. 24A is a timing diagram showing one of two possible cold training sequences (CTS) initiated by halting the link clock forcing the link_alive signal inactive. Prior to re-starting the link clock, the data training fence pattern is transmitted on the data channel. Re-establishing the link clock causes the link_alive signal to be asserted a short number of clocks thereafter allowing the training of the DSC Module to continue. The training fence pattern is terminated by the SSM byte. System data immediately follows the end of the cold training sequence.
Figure 24B:
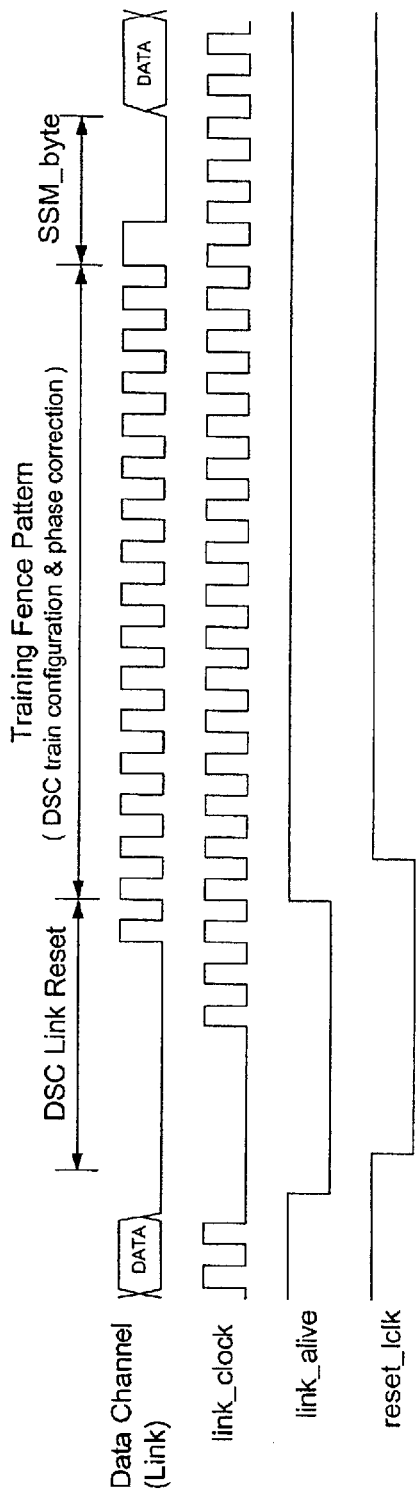
FIG. 24B is timing diagram showing the second possible cold training sequence initiated by halting the link clock, forcing the link_alive signal inactive. Re-establishing the link clock has the signal link_alive asserted a short number of clocks thereafter, allowing the training of the DSC Module to continue. Prior to the assertion of the link_alive signal, the data training fence pattern is transmitted on the data channel. The training fence pattern is terminated by the SSM byte. System data immediately follows the end of the cold training sequence.

Considered in more detail, the DSC Clock Channel 600 shown in FIG. 6 operates as follows during a cold training sequence (CTS). A cold training sequence is initiated when the lnk_clock_in signal is held at either logic state (for example, logical high or logical low) for a specified period of time. As shown in FIGS. 24A and 24B, the lnk_clock_in signal is monitored by a Clock Detect circuit as shown in FIG. 26 residing in the DSC Clock Channel 600 utility block and asserts reset_lclk shown in FIG. 8 and deactivates link_alive when no switching activity on lnk_clock_in has been detected for a specified period of time. This state is referred to as "link reset". Exit from a link reset occurs with resumed switching activity of link clock when all DSC Modules 350-0, 350-1, ... 350-N within the bundle automatically enter an extended training sequence. At this time, the training pattern is and must be present at each lnk_data_in pin of each DSC Data Channel 610 shown in FIG. 5.

Once lnk_clock_in switching activity resumes, the reset_lclk signal is deactivated, and link_alive is asserted synchronously a minimum number of clock cycles thereafter. As shown in FIG. 10, the assertion of reset_lclk sets a signal train_strt2 and deactivates phs_adj_done (mod_clk_adj_done) to all DSC Data Channels 610-0, 610-1, 610-2, 610-3, . . . in the DSC Module 350. The reset_lclk signal assertion also activates link clock std_lnk_clk_b to all of the FSM circuits 1000 in the clock and data channels. The assertion of the train_strt2 signal launches the extended training sequence (ETS) in the clock. In the data channels, assertion of reset_lclk sets local signal train_strt2, while the deactivation of phs_adj_done (mod_clk_adj_done) prevents the DSC Data Channels 610 from completing their clock-to-data-path delay trimming process.

In the DSC Clock Channel 600, the distribution delay of the Clock Image Latch 800 begins with its finite state machine or FSM 860 setting the mode_sel[m:0] and trim_LDD[2:0] vectors, as shown in FIG. 8. The mode_sel[m:0] vector is set to select the meas_cntl input of the DSC Clock Channel 600 input multiplexer, while the trim_LDD[2:0] vector is set to its minimum value. After a required minimum number of link-clock cycles, the meas_cntl signals are asserted, launching a measurement ping pulse down the Delay Line 840, while activating the Clock Image Latch 800 to capture the initial distribution delay image. A dna_latch_en signal is asserted by the FSM 860 to save the binary-encoded value in the DNA logic latch 830. The FSM 860 begins the process to refine the distribution delay image by deactivating the meas_cntl signals and incrementing the trim_LDD vector value to increase the latch distribution delay by approximately one-eighth of one tap delay. The meas_cntl signal is asserted once again to capture the incremented distribution delay value. A match_LDD signal is asserted when the binary-encoded value of the Clock Image Latch 800 equals the pervious latched value of the latch distribution delay image. The FSM 860 monitors the state of the match_LDD signal and performs one of three functions. First, if the match_LDD signal remains asserted and the trim_LDD vector does not equal its maximum value, the trim_LDD vector value is incremented, and the distribution delay image is recaptured. Second, if the match_LDD signal is deactivated, the dna_latch_en signal is cycled to save the most recent delay-image value of the distribution delay image and proceeds to the next phase of the trimming procedure. Third, if signal match_LDD remains asserted and the trim LDD vector equals its maximum value, the FSM 860 resets the trim_LDD vector to zero and proceeds to the next phase of the trimming procedure.

The matching of the data-recovery link clock to the standard link clock path delay is the final sequence of the trimming process of the DCS Clock Channel 600 extended cold training sequence. As shown in FIG. 8, matching the propagation delay delta between the drc_lnk_clk and the std_lnk_clk clock signal paths requires a gross delay adjustment realized in the Delay Line 840 of the DSC Clock Channel 600. Fine delay adjustments to the drc_lnk_clk signal path are realized by a Trim Delay Circuit 850 used to insert delay.

As shown in FIG. 8, the FSM 860 first sets the mode_sel vector to select the std_lnk_clk input of the DSC Clock Channel 600 input multiplexer and the force_tap vector to zero selecting tap "zero" of the DSC Clock Channel Delay Line 840. The trimL2_sel[2:0] vector to the Trim Delay Circuit 850 is also set to a zero value by the FSM 860 in this segment of the training sequence. The FSM 860 asserts a reflow_conf_en signal to configure the Delay Line 840 for trimming mode operation. While operating in the trim mode configuration, the signal applied to its "event input" is routed directly to the tap0. The signal applied to the "echo input" is routed such that it will travel the full length of the Delay Line 840 excluding tap0. When in this configuration the delay image of the signal applied on the "echo input" of the Delay Line 840 can be captured with the Clock Image Latch 800. Waiting a minimum number of clock cycles, the FSM 860 asserts a trim_st2dr_en signal to capture an initial skew image of the dre_lnk_clk to std_lnk_clk clock signals with a force_tap vector value of zero.

The Image Decode Logic 810 decodes this value to select a tap that aligns an edge of the drc_lnk_clk signal to an edge of the std_lnk_clk signal. The selected tap value is converted to a binary value by the String-to-Binary Encoder circuit 820 and passed to the DNA logic block 830. The FSM 860 cycles a trim_latch2_en signal to capture the encoded binary value of the tap to align signals drc_lnk_clk and std_lnk_clk and complete the gross-tuning segment.

With the completion of the gross-tuning segment, the FSM 860 begins the fine-tuning segment using the value captured during the gross-tuning segment as the initial value. The FSM 860 increments the trimL2_sel vector and cycles the trim_st2dr_en signal to capture an updated fine-tune skew image. The FSM 860 monitors the state of a match_trm2 signal and performs one of three functions. First, if the match_trm2 signal remains asserted and the trimL2_sel vector does not equal its maximum value, the trimL2_sel vector value is incremented, and an updated skew image is captured. Second, if the match_trm2 signal is deactivated, the trim_latch2_en signal is cycled to save the most recent skew image of the drc_lnk_clk to std_lnk_clk clock signals to complete the trimming procedure. Third, if the match_trm2 signal remains asserted and the trimL2_sel vector equals its maximum value, the FSM 860 resets the trimL2_sel vector to zero to complete the trimming procedure. Once the trimming procedure is complete, the drc_lnk_clk to std_lnk_clk clock signals are zero-phase-locked or 180-phase-locked. Upon completion of the fine-tune segment, the DSC Clock Channel FSM 860 maintains the inactive state of signal phs_adj_done (mod_clk_adj_done) shown in FIG. 8 to the DSC Data Channels 610 within the DSC Module 350 and immediately begins the process to measure the link clock period and calculate its quarter lambda offset value. The FSM 860 asserts a meas_strt signal to create a meas_pulse signal at the DSC Clock Channel 600 delay line input, as shown in FIG. 8. On the next clock cycle, the meas_cntl signal is asserted, capturing the clock period measurement in the Clock Image Latch 800 and terminating the meas_pulse signal one clock cycle later, returning to the normal link clock waveform. The clock image word is an N-bit word representing the clock period of the received link clock signal in terms of delay taps or simply "taps". A "one-hot" decode of the clock image word is performed by the Image Decode Logic 810, which locates the tap of the first 1-to-0 transition, representing the period of the link clock signal. The String-to-Binary Encoder circuit 820 converts the "one-hot" tap location to a binary value generating the tap_decode vector shown in FIG. 8. The tap_decode vector output of the String-to-Binary Encoder circuit 820 is a binary value of the link clock period that is processed further by the DNA logic block 830 to generate final tap_adr signals. The DNA logic block 830 performs a set of arithmetic operations on the tap_decode vector to arrive at the final tap_adr value. As shown in FIG. 29A, in a first and second operation the binary value of the Clock-Image-Latch distribution delay is subtracted from the tap_decode vector, and then the adjusted value is right-shifted two positions to derive a divide-by-four value. In a third operation, a balance delay value is added to the results of the divide-by-four operation to produce the final tap_adr value. The balance delay value is required to align the edges of the drc_lnk_clk and std_lnk_clk clock signals. Once the clock channel CTS operation has completed, the DSC Clock Channel FSM 860 asserts signal phs_adj_done (mod_clk_adj_done) allowing the data channels to complete the CTS operation. The DSC Data Channels 610-0, 610-1, 610-2, 610-3, . . . shown in FIG. 6 operate as follows during a cold training sequence (CTS). Referring to FIG. 10, the assertion of the reset_lclk signal sets the train_strt2 signal and deactivates DSC Data Channel signal phs_adj_done shown in FIG. 10 to all of the DSC Data Channels 610-0, 610-1, 610-2, 610-3, . . . in the DSC Module 350. Assertion of the train_strt2 signal launches the extended training sequence (ETS) in the data channels, while the deactivation of the mod_clk_adj_done signal prevents the DSC Data Channels 610-0, 610-1, 610-2, 610-3, . . . from completing the trimming and phase correction processes.

Referring to FIG. 10, in the DSC Data Channel 610, the distribution delay of the Data Image Latch 1010 begins with its finite state machine or FSM 1000 setting the mode_sel [1:0 ] and trim_LDD[2:0] vectors. The mode_sel[1:0] vector is set to select the meas_en input of the DSC Data Channel 610 input multiplexer and while the trim_LDD [2:0] vector is set to its minimum value. Waiting a minimum number of std_lnk_clk cycles, the meas_en signals are asserted, launching a measurement ping pulse down the DSC Data Channel 610 Delay Line 1040 while activating the Data Image Latch 1010 capturing the initial latch distribution delay image. A dna_latch_en signal is asserted by the FSM 1000 to save the binary-encoded value in the DNA logic latch 1040. The FSM 1000 begins the process to refine the distribution delay image by deactivating the meas_en signals and incrementing the trim_LDD vector value to increase the latch distribution delay by approximately one-eighth of one tap delay. The meas_en signal is asserted once again to capture the incremented distribution delay value. A match_LDD signal is asserted when the binary-encoded value of the Data Image Latch 1010 equals the pervious latched value of the latch distribution delay image. The FSM 1000 monitors the state of the match_LDD signal and performs one of three actions. First, if the match_LDD signal remains asserted and the trim_LDD vector does not equal its maximum value, the trim_LDD vector value is incremented, and the updated distribution delay image is captured. Second, if the match_LDD signal is deactivated, the dna_latch_en signal is cycled to save the most recent delay image value of the distribution delay and proceeds to the next phase of the trimming process. Third, if the match_LDD signal remains asserted and the trim_LDD vector equals its maximum value, the FSM 1000 resets the trim_LDD vector to zero and proceeds to the next phase of the trimming process.

The data-recovery link clock to phase-adjusted-data path delay matching is the final sequence of the trimming process of the DSC Data Channel 610 cold training sequence. This segment of the Data Channel cold training sequence is gated by a Clock Channel signal mod_clk_adj_done, starting only after its assertion. Referring to FIG. 10, matching the propagation delay delta between the drc_lnk_clk and phs_adj_data signal paths requires a gross delay adjustment realized in the DSC Data Channel 610 Delay Line 1070. Fine-tuned delay adjustments of the phs_adj_data signal path are realized by the Trim Delay Circuit 1050 used to insert delay and measurement using the combination of the Data Image Latch 1010, Image Decode Logic 1020, String-To-Binary Encoder circuit 1030, and DNA logic block 1040.

The FSM 1000 first sets the mode_sel vector value to select the drc_lnk_clk input of the DSC Data Channel 610 input multiplexer and the force_tap vector to zero, selecting tap zero of the DSC Data Channel Delay Line 1070. The FSM 1000 also sets vector trim_c2d_sel[2:0] to a zero value and asserts a reflow_conf_en signal to configure the Delay Line 1070 for trimming mode operation. While operating in its trimming mode configuration, the signal applied to the "event input" is routed directly to the tap0. The signal applied to the "echo input" is routed such that it will travel the full length of the Delay Line 1070 excluding tap0. When in this configuration the delay image of the signal applied on the "echo input" of the Delay Line 1070 can be captured with the Data Image Latch 1010. Waiting a minimum number of clock cycles, the FSM 1000 asserts the trim_c2d_en signal to capture an initial skew image of the drc_lnk_clk to phs_adj_data signal with a force_tap vector value of zero.

The Image Decode Logic 1020 decodes this value to select a tap that aligns an edge of the drc_lnk_clk signal to an edge of the phs_adj_data signal. The selected tap value is converted to a binary value by the String-to-Binary Encoder circuit 1030 and passed to the DNA logic block 1040. The FSM 1000 cycles a trim_c2d_en signal to capture the encoded binary value of the tap to align the drc_lnk_clk and phs_adj_data signals and complete the gross-tuning segment.

With completion of the gross-tuning segment, the FSM 1000 begins the fine-tuning segment using the value captured during the gross-tuning segment as the initial value. The FSM 1000 increments the trim_c2d_sel[2:0] vector, then cycles the trim_c2d_en signal to capture an updated fine-tune skew image. The FSM 1000 monitors the state of a match_vec2[2:0] signal and performs one of three actions. First, if the match_vec2[2:0] signal remains asserted and the trim_c2d_sel[2:0] vector does not equal its maximum value, the trim_c2d_sel2[2:0] vector value is incremented and an updated skew image is captured. Second, if the match_vec2[2:0] signal is deactivated, the trim_c2d_en signal is cycled to save the most recent skew image of the drc_lnk_clk to phs_adj_data signals to complete the trimming procedure. Third, if the match_vec2[2:0] signal remains asserted, and the trim_c2d sel[2:0] vector equals its maximum value, the FSM 1000 resets the trim_c2d_sel [2:0] vector to zero to complete the trimming procedure.

Referring to FIG. 10, the Data Channel front end FSM 1000 begins the phase-error correction process to edge-align the input data stream with the link clock signal. The FSM 1000 asserts the meas_en signal, capturing a data phase word in the Data Image Latch 1010 on the next rising edge of the link clock signal std_lnk_clk. It is important to note that the capture of the data phase word is referenced to link clock std_lnk_clk that represents drc_lnk_clk with zero offset. Hence, the data phase word represents the phase relationship of the data stream to the data-recovery link clock drc_lnk_clk with an offset value of zero. The data image word is an N-bit word representing the phase error of the received link data signal in terms of delay taps or simply "taps". A "one-hot" decode of the data image word is performed by the Image Decode Logic 1020 which locates the tap position of the first 1-to-0 transition. Referring to FIG. 10, the value of the Data_Image_Latch 1010 bit zero position (referred to as data_image_latch[0]) is used to determine a leading or lagging phase condition of the data image word. A data_image_latch[0] having a value equal to one is regarded as a phase-leading condition and with the data_image_latch[0] value equal to zero indicating a phase-lagging condition. The String-to-Binary Encoder circuit 1030 converts the "one-hot" tap location to a binary value and generates the tap_decode vector. The tap_decode vector output of the String-to-Binary Encoder circuit 1030 is a binary value of the link data phase error that is processed further by the DNA logic block 1040 to generate the final tap_adr signals, as shown in FIG. 10.

For purposes of testing, the final tap_adr value can be further modified by adding or subtracting a registered offset value, a csr_data_ch_offset[5:0] vector. The DNA logic block 1040 performs a set of arithmetic operations on the tap_decode vector to arrive at the final tap_adr value. As shown in FIG. 29B, in a first and second operation the binary value of the Data-Image-Latch distribution delay is subtracted the from the tap_decode vector, and the balance delay value that is required to align the edges of the drc_lnk_clk clock and phs_adj_data signals is added to arrive at the final tap_adr value. A phs_adj_done signal is asserted a sufficient number of clock cycles after the meas_en signal is asserted to assure that phase-corrected data has propagated through the Data Recovery String 1060 shown in FIG. 10. Assertion of the phs_adj_done signal indicates the end of the phase-correction sequence and enables data output signals neg_data_bit and pos_data_bit to the Data FIFO block 900 shown in FIG. 9.

Referring to FIG. 11, in the Data FIFO stack 1170, assertion of the train_strt2 signal resets the SSM Start Sequencer 1130 and activates the std_lnk_clk. Reset of the SSM Start Sequencer 1130 also deactivates the train_mode signal, forcing the Write Pointer 1140 to a zero value. Hence, during a training sequence, only Data FIFO stack 1170 location zero is selected.

As shown in FIG. 11, the neg_data_bit and pos_data_bit streams are written into the Data FIFO stack 1170 on the rising edge of the std_lnk_clk signal. The Data FIFO stack 1170 is preferably implemented as an addressable "write-pre-bit" FIFO to minimize power dissipation. The FIFO write address, fifo_bit_adr, from the FIFO Address Encoder 1150 is derived from the Write Pointer 1140 and Frame Bit Counter 1160 logic blocks along with the state of the pos_pattrn_flg signal. The pos_pattrn_flg signal from the Pattern Search FSM 1120 is a logical one if the positive bits of the Data FIFO stack 1170 all have a value of logical one. Otherwise, the pos_pattrn_flg signal is a logical zero. The Data FIFO read and write order is altered depending on the state of the pos_pattrn_flg signal to maintain proper byte framing due to negative phase alignment of the data stream from the DSC Data Channel front-end block 910 shown in FIG. 9. The fifo_bit_adr signal is updated with the state of the pos_pattrn_flg signal with the deactivation of the train_mode signal during the SSM byte.

With the assertion of the train_mode and phs_adj_done signals, the Pattern Search FSM 1120 begins SSM and training fence pattern searches. In normal operation signal phs_adj_done will be deactivated when the clock channel enters into its training sequence and reactivated once the clock channel has completed its training. During the period of the phs_adj_done signal, deactivation the Pattern Search FSM 1120 suspends its search for the SSM byte and training fence pattern and resumes its search once phs_adj_done has been asserted. If after two transitions of the frame_inc signal the training fence pattern has not been detected, the ssm_err_flg signal is asserted. Waiting two frame_inc signal transitions assures that the DSC Data Channel front-end block 910 has had sufficient time to phase-adjust the data stream to be properly sampled. The SSM search continues, and the ssm_found_flg signal is asserted once the SSM pattern has been detected. If a non-training fence pattern or non-SSM patterns are detected during this time, the ssm_err_flg signal is asserted, ending the SSM search. The states of the ssm_found_flg and ssm_err_flg signals are maintained upon the deactivation of the train_mode signal.

Additionally, the states of the ssm_found_flg and ssm_err_flg signals are transmitted to the DSC Clock Channel 600 shown in FIG. 6 and used internally by the DSC Data Channels 610-0, 610-1, 610-2, 610-3, . . . , as well. The DSC Clock Channel 600 processes these signals and broadcasts the results to all DSC Data Channels 610-0, 610-1, 610-2, 610-3, . . . within the DSC Module 350, as well as to other DSC Modules within the bundle shown in FIG. 3. Internal to the DSC Data Channel 610, these signals are used by the SSM Start Sequencer 1130 logic shown in FIG. 11, that sets the proper byte framing.

The SSM Start Sequencer 1130 aligns and initializes the Write Pointer 1140 and Frame Bit Counter 1160 to properly frame the data byte. This procedure assures that the first data bit received after the training sequence is written to Data FIFO stack 1170 location zero. Upon the assertion of the ssm_found_flg signal, the SSM Start Sequencer 1130 asserts the frame_init signal, while deactivating the frame_strt signal. The frame_init signal forces the Frame Bit Counter 1160 to a zero value to generate a fifo_bit_adr vector of zero, to which the first data bit will be stored. The Write Pointer 1140 and Frame Bit Counter 1160 are held at this initialization state until the SSM Start Sequencer 1130 asserts the frame_strt signal two UI from the end of the SSM byte to start the Frame Bit Counter 1160. The SSM Start Sequencer 1130 deactivates the train_mode signal at the end of the SSM byte. In the case of an SSM error, the ssm_err_flg signal is asserted and used as part of a process to observe error-framed data where the DSC Data Channel 610 outputs data although it is incorrectly framed, allowing the system to diagnose the error condition.

Logic to generate the fifo_bit_adr vector comprises the Write Pointer 1140, Frame Bit Counter 1160, and FIFO Address Encoder 1150 logic blocks. The Data FIFO stack 1170, as previously mentioned, is preferably implemented as a "write-per-bit", where each bit of data is written to a particular bit location pointed to by the fifo_bit_adr vector. The frame_adr signal and a wr_pntr_adr vector are used by the FIFO Address Encoder 1150 to generate the fifo_bit_adr vector. The Frame Bit Counter 1160 is sized for two-byte count intervals, which aligns double frames on an integer number of link clock cycles. Although not required for fifo_bit_adr vector generation, the write pointer is sized to match the read pointer, which reduces the logic needed for Data FIFO status calculations. The least significant portion (or LSB) of the wr_pntr_adr vector is not used by the FIFO Address Encoder 1150 to generate the fifo_bit_adr vector, thus requiring the write pointer to be incremented twice. This requires the Frame Bit Counter 1160 to assert a frame_inc signal to increment the Write Pointer 1140 value on each byte time interval. It is noted that intermediate increment values of the write pointer do not affect the fifo_bit_adr vector, but they allow read-to-write pointer tracking. Configuration of the Write Pointer 1140 and Frame Bit Counter 1160 in this way accommodates odd-numbered encoding schemes (for example, 8b9b) with reduced design complexity.

Figure 27:
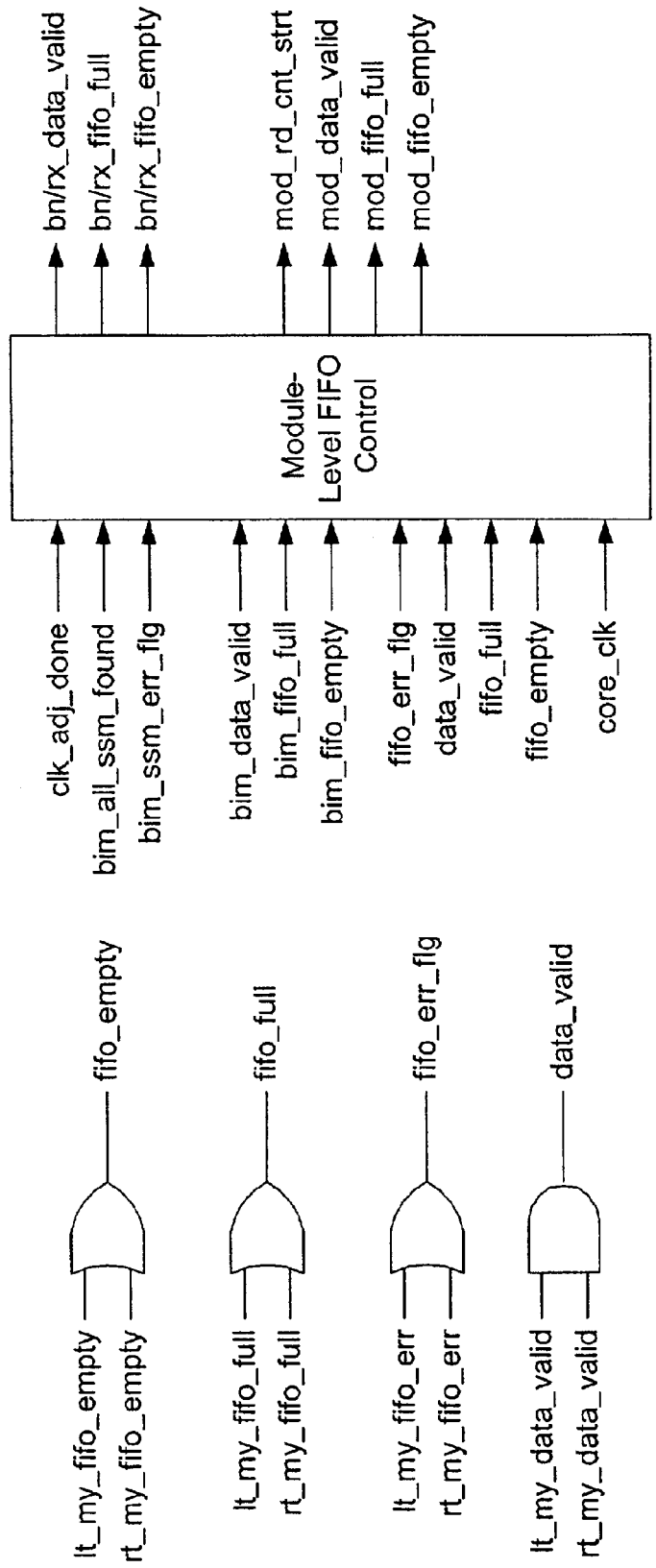
FIG. 27 is a top-level block diagram of the module-level FIFO Control block with logic gates combining the left and right segments of received daisy chained FIFO status signals to generate the FIFO status signals of that DSC Module. A block representing the module-level FIFO control logic receiving FIFO status signals from other DSC Modules within the bundle via the BIM is also shown.

The DSC Clock Channel 600 receives the ssm_found_flg and ssm_err_flg signals from all DSC Data Channels 610-0, 610-1, 610-2, 610-3, . . . within the DSC Module 350. As shown in FIG. 26, a bim_all_ssm_found_flg signal is the logical "AND" of all ssm_found_flg signals from the DSC Data Channels 610-0, 610-1, 610-2, 610-3, . . . and synchronized to the core clock domain before being broadcast to all DSC Modules 350-0, 350-1, . . . ,350-N within the bundle via the BIM 360. A bim_ssm_err_flg signal shown in FIG. 26 is the logical "OR" of all ssm_err_flg signals from the DSC Data Channels 610-0, 610-1, 610-2, 610-3, . . . and is synchronized to the core clock domain before being broadcast to all DSC Modules 350-0, 350-1, . . . , 350-N within the bundle via the BIM 360. Each DSC Module 350-0, 350-1, . . . , 350-N in the bundle receives the broadcast signals bim_ssm_err_flg and bim_all_ssm_found by the utility block of the DSC Clock Channel 600 and generates a mod_rd_cnt_enb signal that is broadcast to all DSC Data Channels 610-0, 610-1, 610-2, 610-3, . . . in the DSC Module 350, as shown in FIG. 27. The mod_rd_cnt_enb signal shown in FIG. 27 is the logical "OR" of bim_ssm_err_flg and bim_all_ssm_found signals shown in FIG. 14. The assertion of the mod_rd_cnt_enb signal marks the end of the training sequence and the start of normal operation.

The Bundle Interface Module (BIM) 360 shown in FIG. 3 operates as follows during a cold training sequence (CTS). The BIM 360 provides an interconnect path for the DSC Module high-speed (link-speed) and low-speed (core-speed) signals. Signals classified as core speed are simply buffered and are presumed to settle within the period of the core clock cycle. Link-speed signals are also buffered but require settling times of multiple link-clock cycles. Hence, for link-speed signals, a BIM 360 calibration sequence is required to properly sample and synchronize link-speed signals. This operation is performed only during CTS operations immediately after a link reset and is completed during the DSC Clock Channel CTS trimming segment. Calibration of the BIM 360 is completely transparent to all functions of the DSC Module 350.

The extended training sequence (ETS) generally operates as follows. The ETS is a super-set of the warm training sequence (WTS) that includes the trimming procedure of the cold training sequence. The purpose of the ETS operation is to match/calibrate delay paths of the clock and DSC Data Channels 610 without initiating a link reset, thus preventing data loss.

ETS operations are initiated at the source node of the transmitter 300 with the SSD Module 310 transmitting an ETS command on all link data channels 320. The ETS command has a minimum number of consecutive command bytes (typically four bytes), that is a unique pattern not found in the normal data stream. Other methods, such as "byte count", may also be used to initiate an ETS command. A minimal length or byte count error-free for the ETS command is required to assure that random bit errors cannot initiate a false training sequence. Once started, ETS operations follow the CTS operations.

In summary, the method of the present invention comprises a unique set of steps or procedures for deskewing a circuit. A series of three procedures that directly and explicitly deskew a circuit is provided. The steps are referred to as: 1) a cold training sequence (CTS); 2) a warm training sequence (WTS); and 3) an extended training sequence (ETS). These steps have proven successful to deskew a circuit.

Preferably, the method of the present invention includes the cold training sequence (CTS). A timing diagram for the CTS is shown in FIGS. 24A and 24B.

Figure 23:
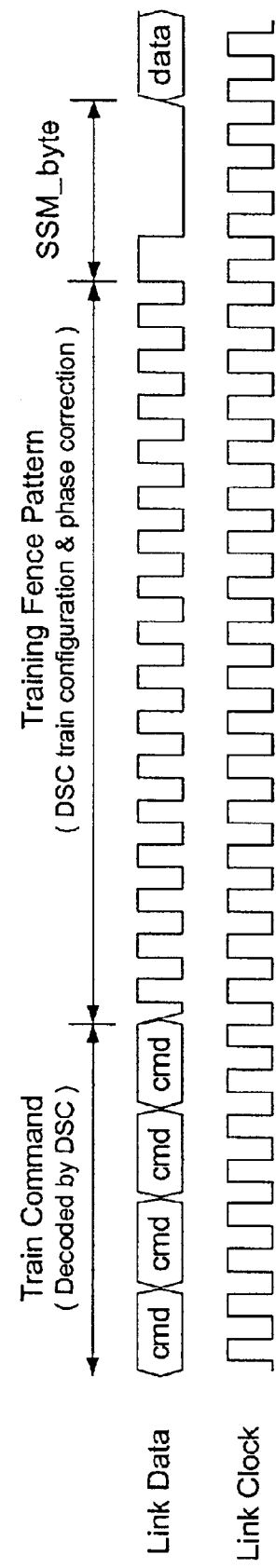
FIG. 23 is a timing diagram showing the warm training sequence (WTS) consisting of the a train command, having a length of four bytes, training fence pattern, and SSM byte followed by system data. Also shown is the link clock signal waveform.

The method of the present invention also includes the warm training sequence (WTS). A timing diagram for the WTS is shown in FIG. 23.

By the end of training provided by the method of the present invention, a circuit is deskewed. This enables the circuit to effectively read data.

The above describes the preferred dynamic skew compensation architecture and method of operation. Two alternate architectures and methods are described below.

A first alternate architecture with a base assumption of a non-modified link clock requires that a sampling offset value be added to the data channel phase-adjust value to obtain the proper sampling point. To achieve this, the phase measurement path and normal data path must have identical equal delays. Hence, those path elements that are present in the data path but not found in the phase measurement path must be replicated to perform a delay cancellation function.

There are two main advantages to this first alternate architecture. The first is a straightforward conceptual understanding. The second advantage is that the link clock is passed throughout the DSC Module 350 and bundle uninterrupted.

On the other hand, a first disadvantage of this architecture is that replication errors of both value and "tracking" over the desired operating range are introduced into all measurements, affecting the final placement of the sampling edge. A second disadvantage is that if the path element to be replicated is large, this will significantly increase the area required to implement the DSC Module 350. A third disadvantage is that this architecture has a greater sensitivity to manufacturing variation Across Chip Length Variation (ACLV), a phenomenon that introduces performance differences between identical circuits located at different locations. A forth disadvantage is that replicated circuits included in either the phase measurement or data paths must meet the design criteria of these paths. This forces those circuits being replicated to meet a design criterion that is much greater than what would be normally required for that particular circuit or function. As a result, an increase in circuit area, power dissipation, and design effort is needed for this architecture.

A second alternate architecture is based on a sweep of the sample point while monitoring the state of the sampling flip-flops' outputs and also assumes a non-modified link clock. This architecture is designed to address the timing error introduced by implementing replicated path elements and timing effects introduced by ACLV.

There are two main advantages to this second alternate architecture with the first being the elimination of the image latches and replicated logic, thereby reducing the area needed. A second advantage is that it directly addresses and has a method to compensate for ACLV timing effects.

On the other hand, a first disadvantage is that the determination of the sampling point is based on detecting the metastable point of the sampling flip-flop. Further, it depends on the accurate modeling of the sampling flip-flops' metastable behavior. Near a metastable point, behavior must be considered which may significantly affect the sample point selected. A second disadvantage is that the warm training sequence is significantly increased due in part to the metastable recovery time and the sample point search algorithm. A third potential disadvantage is the significant increase in the logic and area required to implement the search algorithm. However, this increase may be offset by the elimination of the measurement latch.

Although the present invention has been described with a particular degree of specificity with reference to various embodiments, it should be understood that numerous changes both in the form and steps disclosed can be made without departing from the spirit of the invention. The scope of protection sought is to be limited only by the scope of the appended claims that are intended to suitably cover the invention.

I claim:

1. A system to deskew a parallel data link having a plurality of channels for exchanging digital data, the link comprising:
   source and destination nodes with an interconnect medium there between;
   a Source Synchronous Driver (SSD) at the link source node to format "M" bits of input data received from core logic and to drive "M" data channels onto the link along with a link clock;
   a Dynamic Skew Compensation (DSC) architectural block at the link destination node to receive the "M" data bits and link clock and to compensate for skew, recenter the link clock edge relative to the bits of data, and output "M" bits of data, the DSC block comprising:
      a DSC bundle consisting of a plurality of DSC Modules interconnected with a Bundle Interface Module, wherein the DSC Modules perform adjustments to compensate for channel-to-channel skew and substantially center the link clock edge with respect to the data bits;
      wherein each DSC Module comprises a plurality of DSC Data Channels and a DSC Clock Channel; and
      wherein the DSC Clock channel comprises a Clock Channel Front-End block, Built-In Self-Test Logic, and a utility block.

2. The system of claim 1 wherein the Clock Channel Front-End block comprises a finite state machine, Clock Image Latch, Image Decode Logic, String-to-Binary Encoder circuit, DNA logic block, Delay Line, Trim Delay Circuit, and glue logic.

3. The system of claim 1 wherein the DSC bundle performs a cold training sequence.

4. The system of claim 1 wherein the DSC bundle performs a warm training sequence.

5. A system to deskew a parallel data link having a plurality of channels for exchanging digital data, the link comprising:
   source and destination nodes with an interconnect medium there between;
   a Source Synchronous Driver (SSD) at the link source node to format "M" bits of input data received from core logic and to drive "M" data channels onto the link along with a link clock;
   a Dynamic Skew Compensation (DSC) architectural block at the link destination node to receive the "M" data bits and link clock and to compensate for skew, recenter the link clock edge relative to the bits of data, and output "M" bits of data, the DSC block comprising:
      a DSC bundle consisting of a plurality of DSC Modules interconnected with a Bundle Interface Module,
      wherein the DSC Modules perform adjustments to compensate for channel-to-channel skew and substantially center the link clock edge with respect to the data bits;
      wherein each DSC Module comprises a plurality of DSC Data Channels and a DSC Clock Channel; and
      wherein each DSC Data Channel comprises a Data Channel Front-End block, Data FIFO, and utility block.

6. The system of claim 5 wherein the Data Channel Front-End block comprises a finite state machine, Data Image Latch, Image Decode Logic, String-to-Binary Encoder circuit, DNA logic block, Delay Line, Trim Delay Circuit, and glue logic.

7. The system of claim 5 wherein the Data FIFO comprises a Pattern Search finite state machine, Data FIFO Register File, FIFO Address Encoder, Write Pointer, Read Pointer, Frame Bit Counter, and Skew Synchronizing Marker Start Sequencer.

8. The system of claim 7 wherein the Data FIFO Register File is a write-per-bit FIFO.

9. The system of claim 5 wherein the DSC bundle performs a cold training sequence.

10. The system of claim 5 wherein the DSC bundle performs a warm training sequence.

* * * * *